US011187936B2

(12) United States Patent
Oka et al.

(10) Patent No.: US 11,187,936 B2
(45) Date of Patent: Nov. 30, 2021

(54) DISPLAY APPARATUS HAVING FIRST AND SECOND LIGHT BLOCKING FILMS

(71) Applicant: Japan Display Inc., Minato-ku (JP)

(72) Inventors: Shinichiro Oka, Tokyo (JP); Yosuke Hyodo, Tokyo (JP); Lu Jin, Tokyo (JP); Yasushi Tomioka, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/935,270

(22) Filed: Jul. 22, 2020

(65) Prior Publication Data

US 2020/0348561 A1 Nov. 5, 2020

Related U.S. Application Data

(63) Continuation of application No. PCT/JP2019/000841, filed on Jan. 15, 2019.

(30) Foreign Application Priority Data

Jan. 25, 2018 (JP) .............................. JP2018-010469

(51) Int. Cl.
*G02F 1/1335* (2006.01)
*G02F 1/1337* (2006.01)
(Continued)

(52) U.S. Cl.
CPC .... *G02F 1/133514* (2013.01); *G02F 1/13394* (2013.01); *G02F 1/133711* (2013.01); *G02F 1/136209* (2013.01)

(58) Field of Classification Search
CPC combination set(s) only.
See application file for complete search history.

(56) References Cited

U.S. PATENT DOCUMENTS

2007/0044761 A1* 3/2007 Hoshi ................ F02D 13/0226
123/435
2017/0104182 A1* 4/2017 Kim ..................... H01L 51/5271
2018/0014991 A1 5/2018 Wang

FOREIGN PATENT DOCUMENTS

JP 2010-039345 A 2/2010
JP 2012-118219 A 6/2012
(Continued)

OTHER PUBLICATIONS

International Search Report dated Apr. 9, 2019 in PCT/JP2019/000841 filed on Jan. 15, 2019, citing documents AA & AP-AR therein, 1 page.

*Primary Examiner* — Lauren Nguyen
(74) *Attorney, Agent, or Firm* — Oblon, McClelland, Maier & Neustadt, L.L.P.

(57) ABSTRACT

Regarding a flexible display apparatus, a technique capable of securing connection performance between the members in the thickness direction and reducing the change of the cell gap, and besides, achieving favorable optical property such as the improvement of the aperture ratio is provided. A display apparatus 1 includes: a first substrate SB1 having flexibility; a second substrate SB2 having flexibility; a liquid crystal layer LQ serving as an electrooptic layer; and a display area made of these components. The second substrate SB2 includes: a color filter (second color filter CF2) arranged in a region corresponding to an opening P1 of each pixel in the display area in a plan view; and a first light blocking film BM1 having an ultraviolet-light transmitting property and arranged in a region corresponding to a non-opening P2 between pixels. The electrooptic layer includes a polymer wall PW arranged in a region overlapping the first light blocking film BM1 in a plan view, the region overlapping this film, and connecting a surface Sf11 of the first (Continued)

substrate SB1 and a surface Sf22 of the second substrate SB2.

11 Claims, 18 Drawing Sheets

(51) Int. Cl.
*G02F 1/1339* (2006.01)
*G02F 1/1362* (2006.01)

(56) References Cited

FOREIGN PATENT DOCUMENTS

| | | | | |
|---|---|---|---|---|
| JP | 2017-015787 A | 1/2017 | | |
| WO | WO-2016-208199 | * 1/2017 | ........... | G02F 1/1339 |
| WO | WO 2017/173672 A1 | 10/2017 | | |

* cited by examiner

FIG. 5

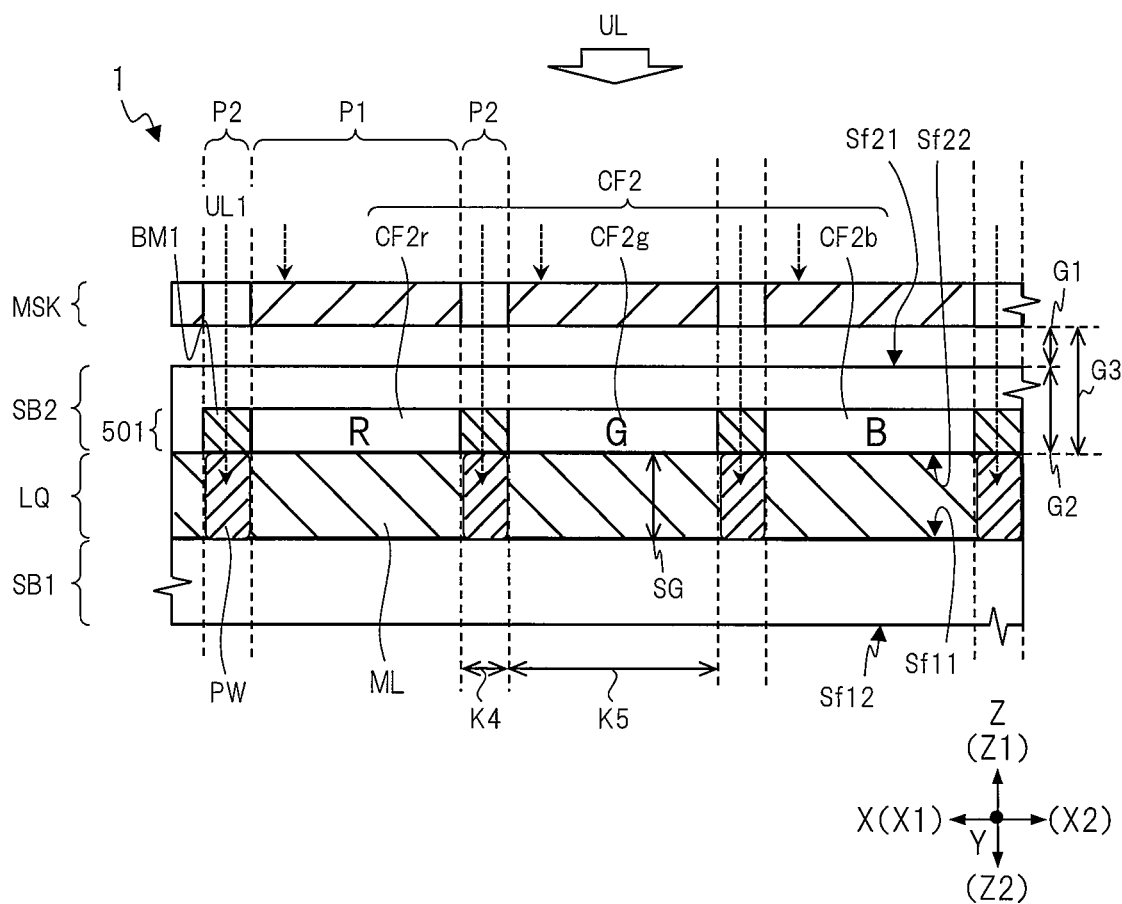

BM1: FIRST LIGHT BLOCKING FILM (UV LIGHT TRANSMITTIVITY)
CF2: SECOND COLOR FILTER (CONVENTIONAL-TYPE UV LIGHT TRANSMITTIVITY)
SB1: FIRST SUBSTRATE
SB2: SECOND SUBSTRATE
 LQ: LIQUID CRYSTAL LAYER
 ML: MONOMER-ADDED LIQUID CRYSTAL
 PW: POLYMER WALL
MSK: LIGHT BLOCKING MASK (FOR STEP OF FORMING POLYMER WALL)
 UL: UV LIGHT
 P1: OPENING (FIRST REGION)
 P2: NON-OPENING (SECOND REGION)
Sf11, Sf22: SURFACE

FF1: FIRST COLOR FILTER (UV LIGHT BLOCKING EFFECT)

DISPLAY APPARATUS HAVING FIRST AND SECOND LIGHT BLOCKING FILMS

TECHNICAL FIELD

The present invention relates to a technique of a display apparatus, and, more particularly, relates to a technique of a flexible display apparatus.

BACKGROUND ART

As display apparatuses such as liquid crystal display apparatuses, display apparatuses each having a surface of a display area where images are displayed have been developed, the surface having flexibility allowing the surface to deflect, curve, bend and others. In such a flexible display apparatus, it is important to maintain a distance (such as a cell gap) between respective in-plane positions in a thickness direction so as to avoid change in the distance as much as possible when the surface of the display area deflects or bends.

As one of technical means for maintaining the constant distance between respective in-plane positions in the thickness direction of the display area as much as possible by suppressing the change in the distance, a technique of forming a polymer wall in an electrooptic layer such as a liquid crystal layer is cited. The polymer wall physically connects upper and lower members such as alignment films in the thickness direction. In this manner, even when the surface of the display area deflects, a distance between the upper and lower members in the thickness direction is maintained by the polymer wall, so that the change in the cell gap of each liquid crystal cell in the plane can be reduced.

In the flexible liquid crystal display apparatus, a material (also referred to as monomer-added liquid crystal) that is obtained by adding a monomer to the liquid crystal is used for the formation of the polymer wall. A manufacturing method includes a step (also referred to as polymer-wall forming step) of forming the polymer wall in a liquid crystal cell of a liquid crystal layer after the formation of the liquid crystal layer and the liquid crystal cell between an upper substrate and a lower substrate in a substrate bonding/liquid-crystal-layer forming step. In the step, ultraviolet ray (also referred to as UV light) is emitted to the liquid crystal layer from above the upper substrate through a light blocking mask corresponding to a polymer-wall forming pattern. The monomers of the monomer-added liquid crystal to which the UV light has been emitted are changed to a polymer by a (polymerization) reaction. In this manner, the polymer wall is formed inside the liquid crystal layer.

As a related art example to the display apparatus and the polymer wall, Japanese Patent Application Laid-Open Publication No. 2017-15787 (Patent Document 1) is cited. The Patent Document 1 describes that a liquid crystal display apparatus prevents display quality from decreasing due to deformation of a display panel, and describes as follows. The liquid crystal display apparatus includes a first substrate, a second substrate having a black matrix (corresponding to the light blocking film), and a liquid crystal layer. The black matrix has an opening at a position overlapping a data line or a gate line in a plan view. In the liquid crystal layer, a wall that is in contact with the first substrate and the second substrate is formed as a wall overlapping the opening. Note that the opening is an opening for use in forming the wall, and is different from openings of the liquid crystal cell and a pixel.

RELATED ART DOCUMENT

Patent Document (Patent Document 1) Japanese Patent Application Laid-Open Publication No. 2017-15787

SUMMARY OF THE INVENTION

Problems to be Solved by the Invention

In the polymer-wall forming step of the flexible liquid crystal display apparatus of the related art example, UV light to be emitted through the light blocking mask is emitted to a member that is formed in an opposite substrate that is the upper substrate, and UV light having a component penetrating the member is emitted to the monomer-added liquid crystal of the liquid crystal layer. As the member, a black light blocking film (so-called black film or black matrix), a color filter of each color and others are cited. In this case, as an optical property of the member, a conventional light blocking film does not transmit the UV light while a conventional color filter almost transmits the UV light. Therefore, in a region (also referred to as non-opening) where the light blocking film is arranged in the surface of the display area, the UV light is hardly emitted to the monomer-added liquid crystal that is arranged below the light blocking film. Therefore, the polymer wall cannot be formed below the light blocking film.

Thus, when the polymer wall is supposed to be formed, the polymer wall is formed inside a region (also referred to as opening) where the light blocking film is not arranged in the surface of the display area. However, when the polymer wall is formed inside the opening, the formation affects the optical property such as an aperture ratio of the liquid crystal cell or the pixel, and therefore, the formation is not so desirable. When the aperture ratio is supposed to increase, the polymer wall is supposed to be formed below the light blocking film. In structures and manufacturing methods of the conventional flexible display apparatuses, it is difficult to form the polymer wall below the light blocking film because of the above-described limitation and others.

A purpose of the present invention relates to a technique of the flexible display apparatus, and is to provide a technique capable of securing connection performance between the members in the thickness direction and reducing the change of the cell gap, and besides, achieving favorable optical property such as the improvement of the aperture ratio, because of the formation of the polymer wall in the display area.

Means for Solving the Problems

A typical embodiment of the present invention relates to a display apparatus, and has a feature with the following configuration. A display apparatus of one embodiment includes: a first substrate having flexibility; a second substrate having flexibility; an electrooptic layer having flexibility and existing between a first surface of the first substrate and a second surface of the second substrate; and a display area made of the first substrate, the second substrate and the electrooptic layer, and having a plurality of pixels that are arranged in a matrix form. The second substrate includes: a color filter that is arranged in a visible-light transmitting portion of each pixel of the plurality of pixels in the display area in a plan view; and a first light blocking film having an ultraviolet-light transmitting property and arranged between the pixels of the plurality of pixels in the display area in a plan view. The electrooptic layer includes a polymer wall that is arranged in a region overlapping the first light blocking film in a plan view and that connects the first surface of the first substrate and the second surface of the second substrate.

Effects of the Invention

According to a typical embodiment of the present invention, in the technique of the flexible display apparatus, by the formation of the polymer wall in the display area, the connection performance between the members in the thickness direction can be secured, and the change of the cell gap can be reduced, and besides, the favorable optical property such as the improvement of the aperture ratio can be achieved.

BRIEF DESCRIPTIONS OF THE DRAWINGS

FIG. 5 is a diagram showing a cross-sectional configuration of the display area in an X direction in a state of a polymer-wall forming step in the display apparatus of the first embodiment;

BEST MODE FOR CARRYING OUT THE INVENTION

Figure 1:
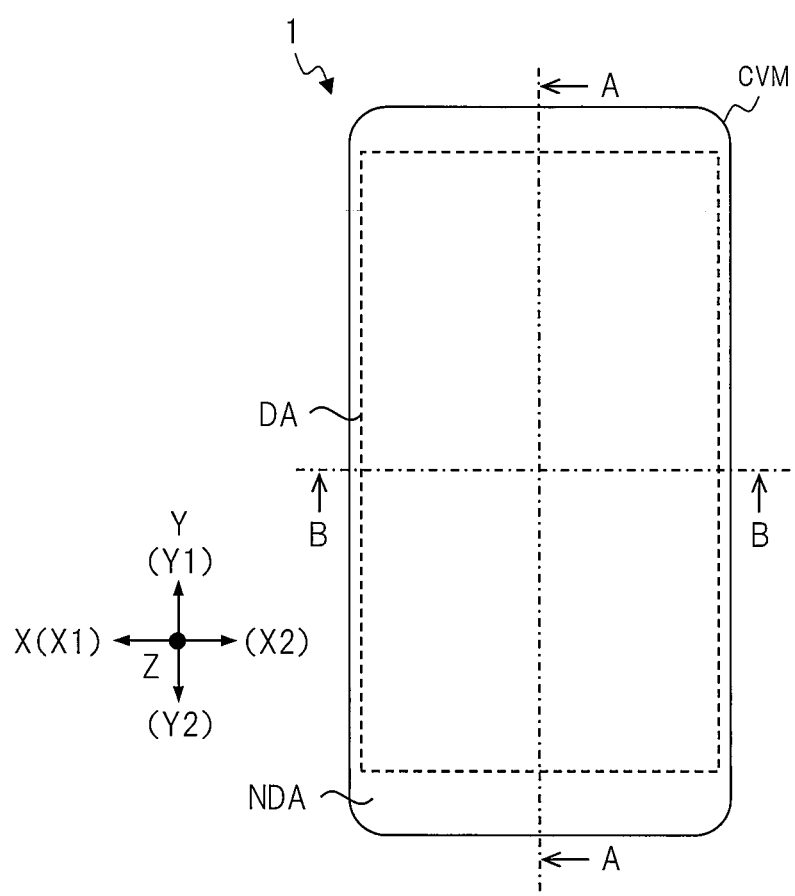
FIG. 1 is a diagram showing a planar schematic configuration in a case of viewing a display area in a plan view in a display apparatus of a first embodiment in the present invention.

Hereinafter, embodiments of the present invention will be described in detail with reference to the accompanying drawings. Note that the same components are denoted by the same reference symbols in principle throughout the drawings, and the repetitive description thereof will be omitted. Also, in order to make the clear description, a width, a thickness, a shape, and others of each portion in the drawings are schematically illustrated in some cases, but these are only examples and do not limit the interpretation of the present invention. In order to easily understand the drawings, cross-sectional hatching is partially omitted in some cases. For explanation, note that an X direction (first direction), a Y direction (second direction) and a Z direction are used as directions. The X direction and the Y direction are two directions that are orthogonal to or cross each other, the directions configuring the display area of the display apparatus. The Z direction is a perpendicular direction to the display area, and is the thickness direction of the display apparatus. The X direction corresponds to a horizontal direction (in-plane horizontal direction) of the display area, and the Y direction corresponds to a vertical direction (in-plane vertical direction) of the display area. For explanation, note that the plan view means that an X-Y plane corresponding to the display area is viewed in the Z direction.

Comparative Example

Problems and others will be supplementarily explained.

Figure 22:
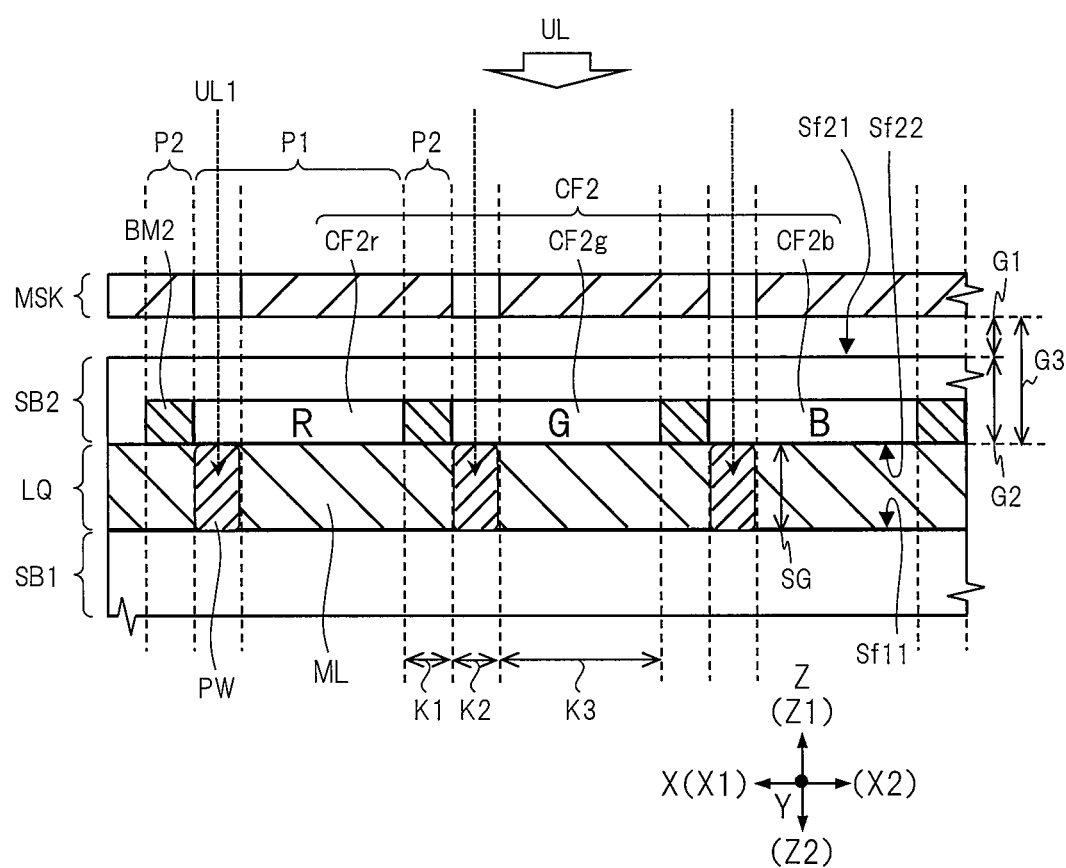
FIG. 22 is a diagram showing a cross-sectional configuration of the display area in the X direction in the state of the polymer-wall forming step in a display apparatus in a comparative example of embodiments.

FIG. 22 shows a cross-sectional configuration of a display apparatus in a state of a polymer-wall forming step in a comparative example to embodiments. FIG. 22 shows three adjacent liquid crystal cells ad pixels in a cross section of an X-Z plane of the display area of the display apparatus. A first substrate SB1, a liquid crystal layer LQ, and a second substrate SB2 are arranged from a bottom side (Z2) in this order. The liquid crystal layer LQ includes a monomer-added liquid crystal ML. A second light blocking film BM2 and a second color filter CF2 are formed in the second substrate SB2. The second light blocking film BM2 is a conventional light blocking film of a black color having a UV-light blocking property. The second color filter CF2 is a conventional color filter having a UV-light transmitting property. The second color filter CF2 includes a red (R) color filter CF2r, a green (G) color filter CF2g and a blue (B) color filter CF2b.

The second light blocking film BM2 is arranged in a non-opening P2 between the pixels. The second light blocking film BM2 has a property (also referred to as UV-light blocking property) that does almost not transmit the UV light. The second color filter CF2 has a property (also referred to as UV-light transmitting property) that almost transmits the UV light. Therefore, as described above, the polymer wall PW cannot be formed below the second light blocking film BM2. In the configuration example of FIG. 22, the polymer wall PW is formed in a region next to the second light blocking film BM2 in the X direction, the region protruding into the opening P1. The polymer wall PW connects a surface Sf11 of the first substrate SB1 and a surface Sf22 of the second substrate SB2.

The opening P1 is a first region that is a visible-light transmitting portion of the pixel. The non-opening P2 is a second region that is a visible-light blocking portion between the pixel. The openings P1 are arranged in, for example, a matrix form in the display area. The non-openings P2 are arranged in, for example, a grid form in the display area. The second light blocking film BM2 of the non-opening P2 is a grid-form light blocking film.

The light blocking mask MSK is a mask for use in the polymer-wall forming step. The light blocking mask MSK functions as an opening having the UV-light transmitting property in a partial region of the opening P1 corresponding to a region where the polymer wall PW is formed, but functions as a region having the UV-light blocking property in another region including the non-opening P2. In the polymer-wall forming step, the UV light "UL" is emitted to an entire surface of the display area from an upper side (Z1) to a lower side (Z2) in the Z direction. An example of a part of the UV light UL is shown as arrow UV light "UL1".

On an upper surface side of the display apparatus in the state of FIG. 22, the light blocking mask MSK is arranged at a position that is away from the upper surface Sf21 of the second substrate SB2 by a predetermined distance G1. The distance G1 is set to be a short distance as much as possible. A thickness of the second substrate SB2 is defined as a distance G2. A distance that is a sum of the distances G1 and G2 is defined as a distance G3. The light blocking mask MSK is arranged at a position that is away by the distance G3 from the upper surface of the liquid crystal layer LQ (the lower surface Sf22 of the second substrate SB2). In other words, there is the distance G3 when the UV light UL is emitted to the monomer-added liquid crystal ML in the Z direction. It is thought that reflection, refraction and others of the UV light UL occur depending on the distance G3. The larger the distance G3 is, the higher the difficulty in the formation of the polymer wall PW in the manufacturing step is, and the higher the load on the manufacturing step is. In other words, the smaller the distance G3 is, the easier the formation of the polymer wall PW in the manufacturing step is, and the higher the process accuracy is.

FIG. 22 shows a width K3 of the opening P1 narrowed by the opening P1, the non-opening P2, a width K1 of the second light blocking film BM2, a width K2 of the polymer wall PW and the polymer wall PW in the X direction. The width K1 and others are lengths in the X direction. The polymer wall PW almost has a light blocking property for the transmitted light that is controlled by a liquid crystal element of the pixel, and decreases a transmittance of the pixel.

In the manufacturing step, the emitted UV light UL (UL1) penetrates a region corresponding to the width K2 that is a partial region of the light blocking mask MSK, and is emitted to a part of the second color filter CF2 next to the second light blocking film BM2. The UV light UL (UL1) penetrates the part, and is emitted to the monomer-added liquid crystal ML of the liquid crystal layer LQ. The UV light UL (UL1) is absorbed by the monomers of the monomer-added liquid crystal ML, and the monomers are changed to a polymer by a (polymerization) reaction. In this manner, the polymer wall PW is formed in a region corresponding to the part. There is the polymer wall PW having the width K2 in a region corresponding to the second filter CF2 of the liquid crystal cell and the pixel. Therefore, a width of the opening P1 inside the pixel is about the width K3. In other words, the case of the formation of such a polymer wall PW has a lower aperture ratio of the liquid crystal cell and the pixel than that of a case of no formation.

In the comparative example, since a position of the region where the polymer wall PW is formed is a position of the partial region inside the opening P1 next to the second light blocking film BM2, alignment of the light blocking mask MSK in the manufacturing step is difficult. As a result, the process accuracy of the polymer wall PW decreases.

First Embodiment

With reference to FIGS. 1 to 9, a display apparatus of a first embodiment of the present invention will be explained. On the basis of the above-described problems and others, in the display apparatus of the first embodiment, a formed structure of the polymer wall below the light blocking film and others have been devised. The display apparatus of the first embodiment will be described in a case of a liquid crystal display apparatus having a liquid crystal layer serving as one type of an electrooptic layer.

[Display Apparatus (1)]

FIG. 1 shows a planar schematic configuration of an X-Y plane in a case of viewing a display area DA in a plan view in a display apparatus 1 of the first embodiment. This display apparatus 1 is a liquid crystal display apparatus having a flexible display area DA. This display apparatus 1 is equivalent to a liquid crystal display panel applied to, for example, a mobile information terminal apparatus, but is similarly applicable to apparatuses of other types. Note that a left side of each drawing is shown as "X1" while a right side of each drawing is shown as "X2" as the X direction. An upper side of each drawing is shown as "Y1" while a lower side of each drawing is shown as "Y2" as the Y direction.

Figure 2:
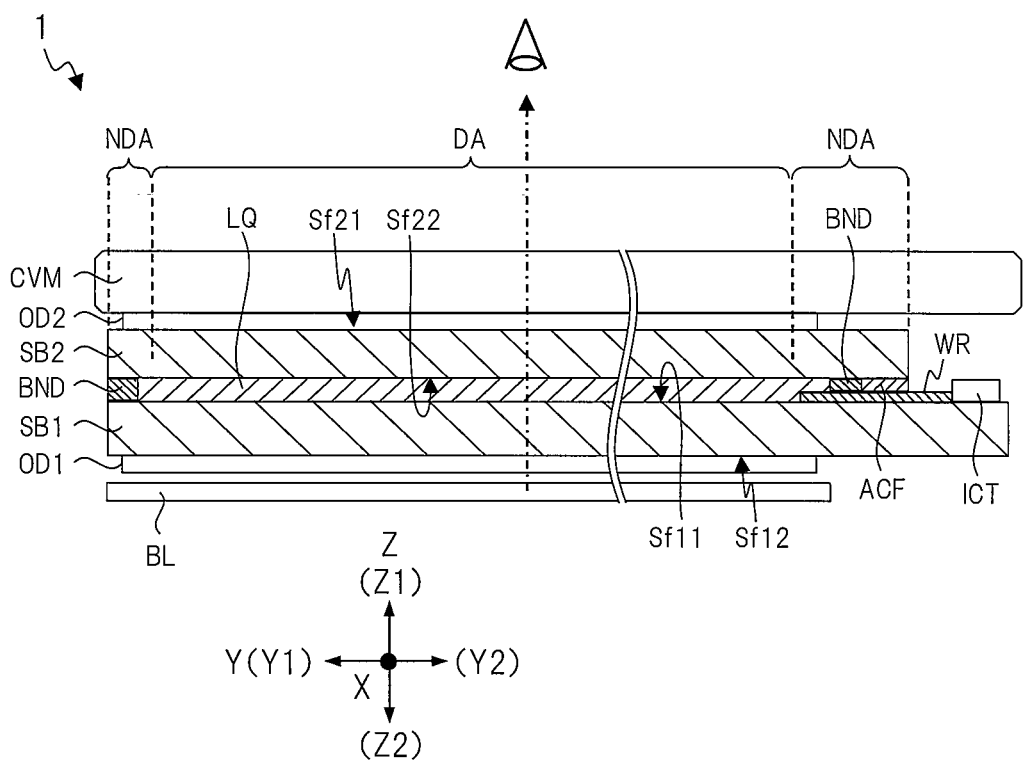
FIG. 2 is a diagram showing a cross-sectional schematic configuration in a case of viewing an A-A section in a Y direction in the display apparatus in the first embodiment.

In FIG. 1, the display apparatus 1 has a cover member CVM when being viewed from a display surface side. The cover member CVM is a member for protecting the display apparatus main body as described later (FIG. 2). Note that an aspect without the cover member CVM is also applicable as a modification example. An upper-side plane of the display apparatus main body and the cover member CVM has a rectangular display area DA and a non-display area NDA. In a plan view, a boundary between the display area DA and the non-display area NDA is shown with a broken line. The display area DA is equivalent to the display surface, is an area where images can be displayed on the basis of image signals, and has a plurality of pixels that are arranged in a matrix form. The non-display area NDA is an area out of the display area DA, and is equivalent to a frame region.

In the configuration example of the display apparatus 1 of FIG. 1, a flexible substrate such as a flexible printed circuit board is not connected to a principal substrate unit including the display area DA. However, the display apparatus may be configured so that such a flexible substrate is connected. While the display area DA has the longitudinal rectangular shape, the shape is not limited to this, and any shape is applicable.

[Display Apparatus (2)]

FIG. 2 shows a cross-sectional schematic configuration of the display apparatus 1. FIG. 2 shows a cross section of a Y-Z plane corresponding to a line A-A of FIG. 1 in a non-deflected state of the display area DA. Note that an upper side of each drawing is shown as "Z1" while a lower side of each drawing is shown as "Z2" as the Z direction. A left side of each drawing is shown as "Y1" while a right side of each drawing is shown as "Y2" as the Y direction. In an order from a lower side (Z2) in the Z direction, the display apparatus 1 includes a backlight unit BL, an optical element layer OD1, a first substrate SB1, a liquid crystal layer LQ, a second substrate SB2, an optical element layer OD2, and a cover member CVM, and they are connected to one another. The first substrate SB1 and the second substate SB2 face each other in the Z direction, and are connected to each other so that the liquid crystal layer LQ is interposed therebetween. The display area DA of FIG. 1 is made of the first substrate SB1, the second substate SB2, the liquid crystal layer LQ and others. Note that illustration of a housing of the display apparatus 1 and others is omitted.

The first substrate SB1 is an array substrate in which a switching element, an electrode such as a conductive pattern and others are arranged. The second substrate SB2 is an opposite substrate which is arranged so as to be close to the display surface and so as to face the first substrate SB1, and in which the color filter, the black film and others are arranged. The liquid crystal layer LQ is a layer which contains a liquid crystal element and which modulates the light that penetrates the liquid crystal element by control of an electric field state in accordance with voltage application. The display area DA is arranged in a region overlapping the liquid crystal layer LQ.

There are the liquid crystal layer LQ, a wiring layer WR, a bonding member BND, an anisotropic conductive film ACF and others between the first substrate SB1 and the second substrate SB2. The first substrate SB1 has, for example, an IC chip ICT or others. An outer periphery of the liquid crystal layer LQ has a sealing region made of the bonding member BND and the anisotropic conductive film ACF. The bonding member BND bonds the first substrate SB1 and the second substrate SB2 so as to encapsulate the liquid crystal layer LQ therein.

The second substrate SB2 includes a surface Sf21 (specifically, a surface connected to the optical element layer OD2) facing upward (Z1) in the Z direction and a surface Sf22 (specifically, also referred to as a second surface that is a surface connected to the liquid crystal layer LQ) facing downward (Z2). The first substrate SB1 includes a surface Sf11 (specifically, also referred to as a first surface that is a surface connected to the liquid crystal layer LQ) facing upward (Z1) in the Z direction and a surface Sf12 (specifically, a surface connected to the optical element layer OD1) facing downward (Z2). In the Z direction, an upper surface of the liquid crystal layer LQ is connected to the surface Sf22, and a lower surface of the liquid crystal layer LQ is connected to the surface Sf11.

The wiring layer WR is formed in a part of the liquid crystal layer LQ on the surface Sf11 of the first substrate SB1. The wiring layer WR includes a lead wiring connected to an electrode such as a scan line described later. One end of the wiring layer WTR is connected to an electrode group, and the other end is connected to the circuit such as the IC chip ICT. The wirings of the wiring layer WR are collectively arranged in a part of the non-display area NDA, such as a side portion of the lower side (Y2) in the Y direction of FIG. 1. There is the anisotropic conductive film ACF out of the bonding member BND. The anisotropic conductive film ACF is an insulating film containing conductive particles, and electrically connects the wiring of the first substrate SB1 and the wiring of the second substrate SB2, and physically connects a part of the first substrate SB1 and a part of the second substrate SB2.

The backlight unit BL is a light source unit that emits light and supplies the light to the upper side (Z1) in the Z direction. The emitted light from the backlight unit BL travels in the Z direction through the first substrate SB1, the liquid crystal layer LQ, the second substrate SB2 and others, and the light modulated by the liquid crystal cell penetrates the upper surface side as the visible light of the pixel.

The optical element layer OD1 is arranged in the surface Sf12 of the first substrate SB1 between the first substrate SB1 and the backlight unit BL. The optical element layer OD2 is arranged in the surface Sf21 of the second substrate SB2 between the second substrate SB2 and the cover member CVM. Each of the optical element layers OD1 and OD2 includes at least a polarizer, or may include a phase difference plate or others if needed.

Figure 3:
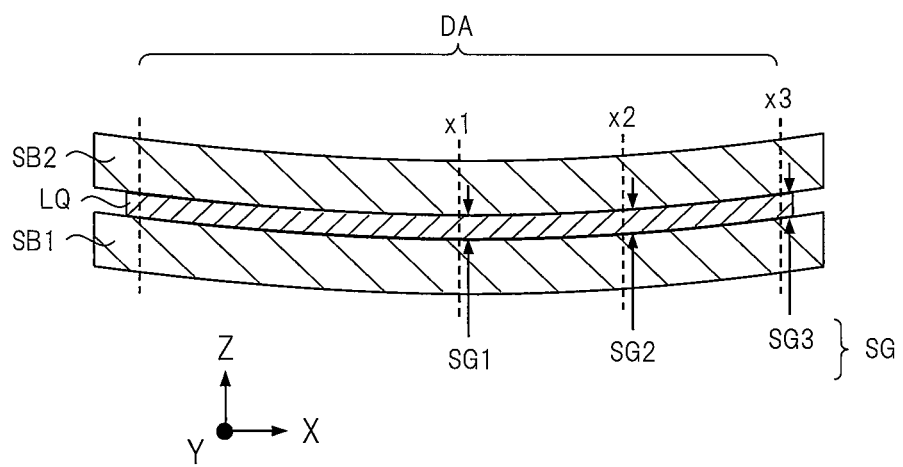
FIG. 3 is a diagram showing a schematic cross section in a deflection state of the display apparatus in the first embodiment.

FIG. 3 simply shows a cross section on the X-Z place corresponding to a B-B line of FIG. 1 in the example of the deflected state of the display area DA. Each of the first substrate SB1, the second substrate SB2, the liquid crystal layer LQ and others has the flexibility. In the example of this state, a portion "x1" around the center of the display area DA in the X direction is deflected downward (Z2) in the Z direction while being centered. In this manner, the display area DA is curved. A cell gap SG corresponding to the thickness, in other words, the distance of the liquid crystal layer LQ in the Z direction will be described. As examples of the cell gap SG, a cell gap SG1 at the portion x1 around the center, a cell gap SG3 at a portion "x3" around the outer periphery of the display area DA, and a cell gap SG2 at a portion "x2" between the cell gaps will be described. Even when the display apparatus 1 has the deflected display area DA, sizes of these cell gaps are maintained to be constant.

As an aspect of the display apparatus 1 of a modification example, a part of at least either the first substrate SB1 or the second substrate SB2 in the non-display area NDA may be deflected or bent on the lower side (Z2) in the Z direction so as to go behind a back surface side of the backlight unit BL or others.

Figure 4:
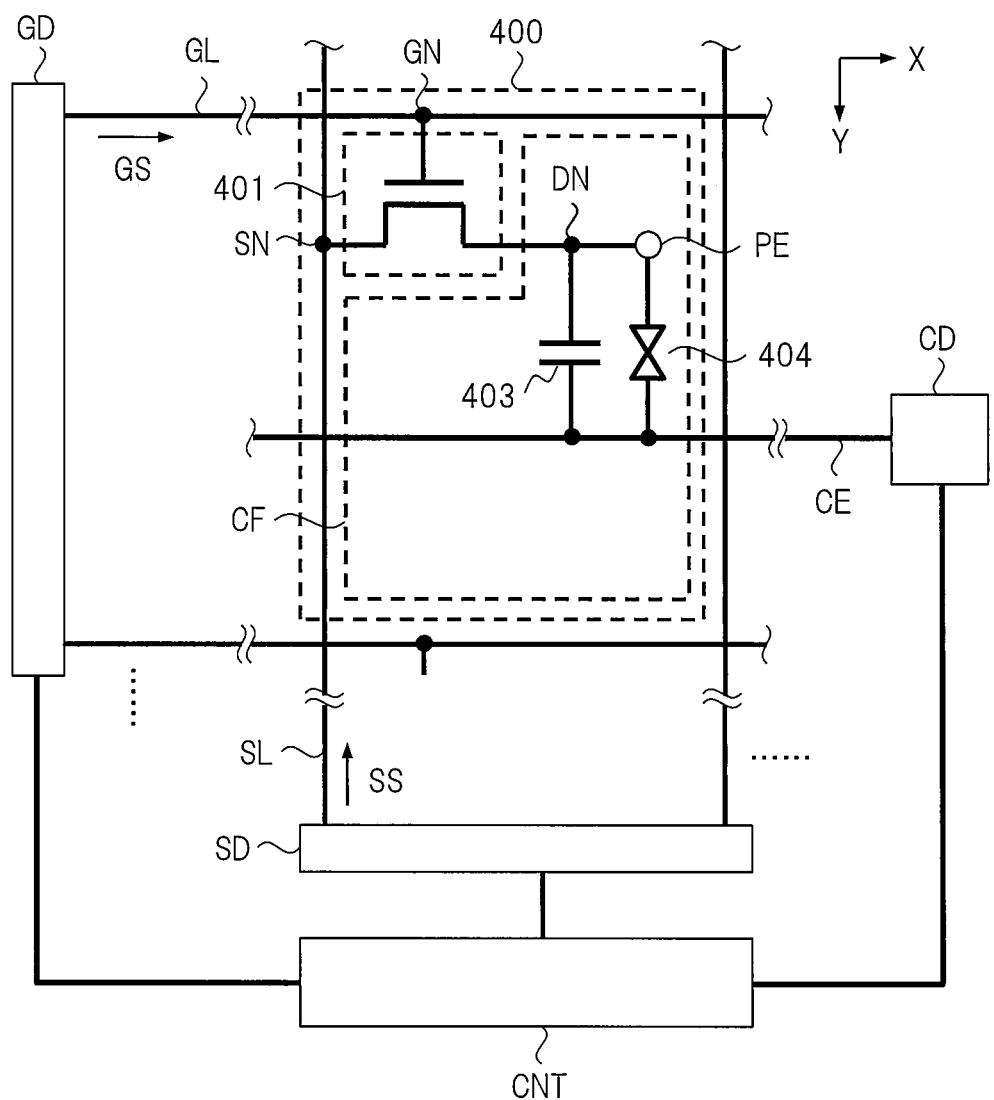
FIG. 4 is a diagram showing a configuration of a pixel, a circuit and others in the first embodiment.

[Display Apparatus (3)] FIG. 4 shows a configuration of a pixel and an equivalent circuit related to a driving circuit or others in the display apparatus 1. In the display area DA, pixels 400 corresponding to the liquid crystal cell are arranged in a matrix form. FIG. 4 shows one pixel 400. The pixel 400 is formed in a portion at which a scan line GL and a signal line SL cross each other. The pixel 400 includes a transistor 401 serving as the switching element, a liquid crystal element 404, a pixel electrode PE, a color filter CF and others.

The pixel 400 is connected to each circuit through the scan line GL, the signal line (source line) SL, the common electrode CE and others. Each circuit includes a scan driving circuit GD, a display driving circuit SD, a common driving circuit CD and others. Each circuit such as the scan driving circuit GD, the display driving circuit SD, the common driving circuit CD and others is connected to a control circuit CNT. The control circuit CNT performs driving control of each circuit. The control circuit CNT generates, for example, an image signal on the basis of an input signal from outside, and generates a signal for use in the driving control on the basis of the image signal. Each circuit is made of, for example, the IC chip ICT of FIG. 2 or others.

The transistor 401 is made of, for example, a thin film transistor, the scan line GL is connected to a gate terminal GN, the signal line SL is connected to a source terminal SN, and a pixel electrode PE is connected to a drain terminal DN.

The scan line GL is a gate line, and a plurality of scan lines GL extend in the X direction in parallel to one another at a predetermined interval. The plurality of scan lines GL are connected to a scan driving circuit GD. The scan driving circuit GD supplies a scan signal (gate signal) GS to the scan line GL. The scan signal GS is a signal for use in selecting the pixel. The signal line SL is a source line, and a plurality of signal lines SL extend in the Y direction in parallel to one another at a predetermined interval. The plurality of signal lines SL are connected to a display driving circuit SD. The display driving circuit SD supplies a display signal (source signal) SS to the signal line SL. The display signal SS is a signal for use in controlling gradation of the pixel.

The pixel electrode PE and the liquid crystal element 404 of each pixel are connected to a common electrode CE. The common electrode CE is connected to a common driving circuit CD. The common driving circuit CD supplies a common voltage to the common electrode CE. The common electrode CE may be made of a single solid layer or a plurality of electrodes.

The pixel electrode PE is a visible-light transmitting electrode having a predetermined shape. The liquid crystal element 404 of the liquid crystal layer LQ and an accumulation capacitor 403 are formed between the pixel electrode PE and the commo electrode CE. When the transistor 401 is turned ON, a voltage is applied to the pixel electrode PE in accordance with the display signal SS. In accordance with a potential difference between the pixel electrode PE and the commo electrode CE, an electric field for use in driving the liquid crystal element 404 is formed, so that modulation of the visible light is controlled.

An opening of the pixel 400 is provided with not only the pixel electrode PE and others but also a color filter CF of any color of red (R), green (G) and blue (B). The upper sides (Z1) of the members such as the transistor 401, the scan line GL and the signal line SL of the pixel 400 and others are overlapped and covered by a light blocking film described later in the Z direction. In other words, the members such as the light blocking film and the transistor 401 are arranged in the non-opening between the pixels 400.

[Cross-Sectional Configuration (1)—Polymer-Wall Forming Step]

FIG. 5 shows the configuration of the display area DA of the display apparatus 1 viewed in the cross section on the X-Z place corresponding to the line B-B of FIG. 1 in the state of the polymer-wall forming step with the UV light emission. The display apparatus 1 of the first embodiment has a feature in which a first light blocking film BM1 that is the UV-light-transmitting light blocking film is used for the non-opening P2 between the pixels in a plan view. In this manner, the polymer wall PW is formed below the first light blocking film BM1. For the UV-light-transmitting light blocking film, materials disclosed in, for example, Japanese Patent Application Laid-open Publication No. 2014-56222, can be used.

The polymer wall PW is firmly bonded to the first substrate SB1 and the second substrate SB2 when being cured. In this manner, the distance between the upper and lower substrates can be secured by the polymer wall PW, so that the change in the cell gap due to an external pressure narrowing and widening the distance between the substrates can be reduced. In addition, the aperture ratio of the liquid crystal cell and the pixel can be more secured or improved than that of the structure in which the polymer wall PW is formed in the opening of the pixel as shown in the comparative example (FIG. 22). In the display apparatus 1, even when the display area DA is deflected or bent, the cell gap SG at each position of the liquid crystal layer LQ can be maintained to be constant.

In FIG. 5, the first substrate SB1, the liquid crystal layer LQ and the second substrate SB2 are formed in the order from the lower side (Z2) in the Z direction. As similar to the comparative example, in the polymer-wall forming step, the light blocking mask MSK is arranged at a position that is away by the predetermined distance G1 from the upper surface Sf21 of the second substrate SB2 in the Z direction.

The opening P1 is a first region that is a visible-light transmitting portion of the pixel. The non-opening P2 is a second region that is a visible-light blocking portion between the pixels. The opening P1 is arranged in the display area DA in, for example, a matrix form. The non-opening P2 is arranged in the display area DA in, for example, a grid form.

The polymer wall PW is a member that physically connects upper and lower members (more specifically, alignment films as shown later in FIG. 8) in the Z direction inside the display area DA. The polymer wall PW has predetermined elasticity. The polymer wall PW is a portion that stands in the Z direction so as to connect the upper and lower members. The upper and lower members specifically mean the surface Sf11 of the uppermost (Z1) member (a first alignment film AL1 of FIG. 8) of the first substrate SB1 and the surface Sf22 of the lowermost (Z2) member (a second alignment film AL2 of FIG. 8) of the second substrate SB2. Note that the shape of the polymer wall PW in an extending direction of the wall inside the display area DA is not particularly limited. The shape may extend in a specific direction (such as Y direction) or may be a pillar shape or others that does not extend in a specific direction but stands in the Z direction only in a specific region.

Even when the display area DA is deflected or others, the change in the distance (cell gap SG) between the upper and lower members in the Z direction is suppressed by the structure including the polymer wall PW. The distance is maintained so as to be almost constant at each in-plane position of the display area DA.

The first light blocking film BM1, the second color filter CF2 and others are arranged in a predetermined layer 501 of the second substrate SB2. In the X direction, a width K4 of the non-opening P2 or the first light blocking film BM1 and a width K5 of the opening P1 or the second color filter CF2 are illustrated. The width K4 and others are lengths in the X direction. As the second color filters CF2 that are the color filters CF, the color filter CF2r of the R color, the color filter CF2g of the G color and the color filter CF2b of the B color are periodically arranged in the X direction. One color is expressed by a set of light at the pixels having three colors of R, G and B. Types of the color filter CF are not limited to these three colors.

The opening P1 of the pixel and the non-opening P2 between the pixels are illustrated in the X direction. The second color filter CF2 or others is arranged in a region corresponding to the opening P1 in the second substrate SB2. The second color filter CF2 is a conventional UV-light-transmitting color filter as similar to the comparative example. Therefore, in the light blocking mask MSK, a region corresponding to the second color filter CF2 functions as the UV-light blocking region.

The first light blocking film BM1 or others is arranged in a region corresponding to the non-opening P2 in the second substrate SB2. Therefore, in the light blocking mask MSK, a region corresponding to the first light blocking film BM1 functions as the UV-light transmitting region. An example of a part of the UV light UL is shown as arrow UV light "UL1".

In the polymer-wall forming step, the UV light UL is emitted downward (Z2) in the Z direction onto the entire surface from above the light blocking mask MSK above the second substrate SB2. The UV light UL (UL1) penetrates the region corresponding to the non-opening P2 of the light blocking mask MSK, and is emitted to the first light blocking film BM1. The UV light UL (UL1) penetrates the first light blocking film BM1, and is emitted to the liquid crystal layer LQ below the first light blocking film BM1. By the (polymerization) reaction in which the UV light UL (UL1) is absorbed by the monomers of the monomer-added liquid crystal ML, the monomers change to the polymer. In this manner, the polymer wall PW is formed in the region below the first light blocking film BM1 of the non-opening P2 in a plan view, the region overlapping the first light blocking film. Since the UV light UL (UL1) is emitted downward (Z2) in the Z direction to the region of the first light blocking film BM1, the polymer is mainly grown in the region below the first light blocking film BM1. In this manner, the polymer wall PW can be limitedly formed in the region below the first light blocking film BM1. The polymer wall PW is not formed in a region corresponding to the opening P1 in the liquid crystal layer LQ. In this manner, in the display apparatus 1 of the first embodiment, the aperture ratio of the liquid crystal cell and the pixel can be made higher than that of the structure of the comparative example. When the polymer wall PW is formed between the pixels, the connection performance between the upper and lower members in the Z direction can be secured, so that the cell gap SG of each pixel can be maintained to be constant. By control of emission conditions (emission light quantity, emission duration, and others) of the UV light UL in the step, the width K4 of the polymer wall PW in the X direction and others can be controlled to some extent.

By the manufacturing method for the display apparatus 1 of the first embodiment, accuracy of the alignment of the light blocking mask MSK in the step can be made higher than the manufacturing method of the comparative example. In the first embodiment, at the time of the arrangement with the distance G1 including the alignment of the light blocking mask MSK, a position of the opening that is the UV-light transmitting region of the light blocking mask MSK may be simply controlled so as to be aligned to a position of the first light blocking film BM1. Therefore, the alignment is easier than that of the comparative example. As a result, the process accuracy of the polymer wall PW can be increased.

The light blocking (black) films such as the first light blocking film BM1 and a second light blocking film BM2 described later (see FIG. 6) suppress the light leakage and the color mixture of the pixel. The second light blocking film BM2 that is of a conventional type is made of a black resin, a metal having a low visible-light reflectance or others.

Note that FIG. 5 shows a case in which a width of the polymer wall PW having the final shape is the same as the width K4 of the first light blocking film BM1. However, the width is not limited to this, and the width of the polymer wall PW may be smaller than the width K4 of the first light blocking film BM1.

[Planar Configuration (1)—Light Blocking Film and Color Filter]

Figure 6:
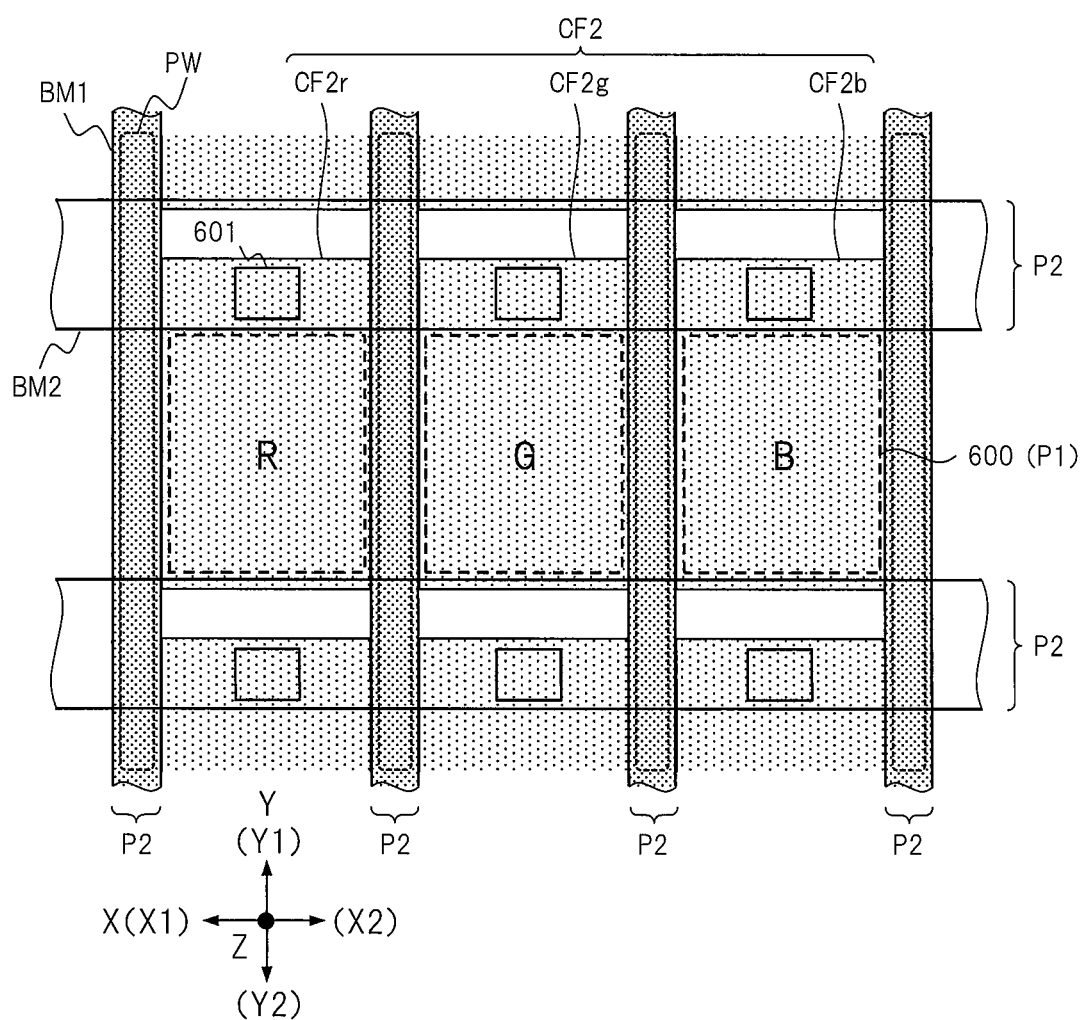
FIG. 6 is a diagram showing a planar configuration example in a case of viewing the pixel of the display area in a plan view in the first embodiment.

FIG. 6 shows a planar configuration of the X-Y plane in a case of viewing the pixels of R, G and B in a plan view in the display area DA of the display apparatus 1, so as to correspond to the structure of FIG. 5. FIG. 6 particularly shows a configuration example of the arrangement of the light blocking film and the color filter. In FIG. 6, from the left side (x1), there are the pixel of the red (R) color, the pixel of the green (G) color and the pixel of the blue (B) color. The opening P1 corresponding to each pixel is shown as an opening 600 with a broken-line frame. The second color filter CF2 {CF2r, CF2g or CF2b} is arranged in the opening 600 of the pixel.

The light blocking film is a black film arranged in a grid form (grid-form light locking film) so as to correspond to the non-opening P2, and includes a horizontal black film that is a light blocking film portion extending in the X direction and a vertical black film that is a light blocking film portion extending in the Y direction. Note that the light blocking film is also arranged in the non-display area NDA.

In the configuration example of FIG. 6, the first light blocking film BM1 is arranged as the vertical black film of the grid-form light blocking film, and the second light blocking film BM2 (the conventional UV-light-blocking light blocking film) is arranged as the horizontal black film of the same. In other words, the first light blocking film BM1 is arranged in the region corresponding to the non-opening P2 in a stripe form extending in the Y direction. The second light blocking film BM2 is arranged in the region corresponding to the non-opening P2 in a stripe form extending in the X direction. Each of the first light blocking film BM1 and the second light blocking film BM2 is formed so as to have a predetermined width. The first light blocking film BM1 is arranged in a region covering the signal line SL and others. The second light blocking film BM2 is arranged in a region covering the scan line GL and the circuit region 601 such as the transistor 401.

The polymer wall PW shown with the broken-line frame is formed below the first light blocking film BM1 in the Z direction in a plan view. In the planar configuration example of the display area DA, two types of the light blocking films that are the first light blocking film BM1 and the second light blocking film BM2 are used together, and the first light blocking film BM1 and the polymer wall PW are formed particularly in the vertical stripe form.

The following is also applicable as modification examples of the planar configuration. A first modification example may be configured so that only the first light blocking film BM1t is used, and so that the first light blocking film BM1 is arranged in the non-opening P2 in a grid form, which correspondingly results in the polymer wall PW in the grid form. Another modification example may be configured so that the second light blocking film BM2 is arranged as the vertical black film while the first light blocking film BM1 is arranged as the horizontal black film, which correspondingly results in the polymer wall PW in the horizontal stripe form.

In the configuration examples of FIGS. 5 and 6, the first light blocking film BM1 and the polymer wall PW are formed so as to correspond to the portions among all the pixels. However, the configuration is not limited to this, and any is applicable. A modification example may be configured so that, for example, the first light blocking film BM1 and the polymer wall PW are formed so as to correspond to some pixels between which a certain distance or others exists in the X direction. The positions, densities or others of the first light blocking film BM1 and the polymer wall PW may be designed in accordance with the necessary connection performance of the display area DA.

In the planar configuration example of FIG. 6, since the vertical black film is used as the first light blocking film BM1, the polymer wall PW can be formed in the region between the pixels in the X direction (at least either the region between the color filters CF in the X direction or the crossing point region of the grid-form light blocking film). This manner can reduce the influence on the leakage (fringing) electric field or others between the pixels that are next to each other in the X direction. Note that a publicly-known component such as a spacer may be further arranged at any of the non-openings P2 in the liquid crystal layer LQ inside the display area DA although described later. The spacer may be arranged at, for example, a position below the crossing point of the grid-from light blocking film.

[Manufacturing Method (1)]

Figure 7:
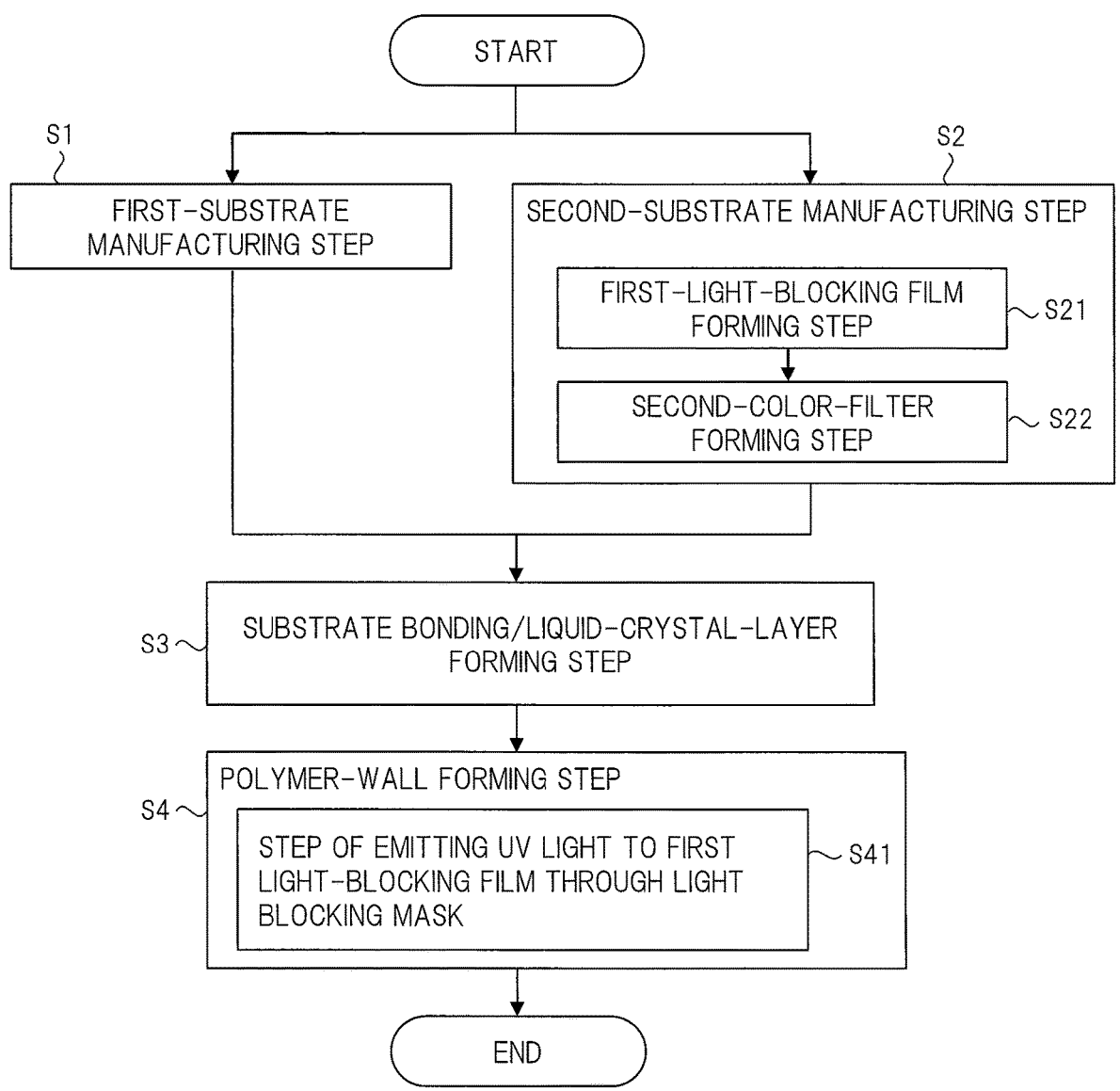
FIG. 7 is a diagram showing a flow of a method of manufacturing the display apparatus in the first embodiment.

FIG. 7 shows a flow of the manufacturing method of the display apparatus 1. The flow of FIG. 7 has steps S1 to S4. The step S1 is a first-substrate manufacturing step of manufacturing the array substrate that is the first substrate SB1. This step includes a step of forming the scan line, the transistor and others. This step includes a step of forming the alignment film (the first alignment film AL1 of FIG. 8) on the surface Sf11 of the first substrate SB1.

The step S2 is a second-substrate manufacturing step of manufacturing the opposite substrate that is the second substrate SB2. This step includes a step S21 of forming the light blocking film such as the first light blocking film BM1 and a step S22 of forming the color filter such as the second color filter CF2. This step includes a step of forming the alignment film (the second alignment film AL2 of FIG. 8) on the surface Sf22 of the second substrate SB2.

The post step S3 of the steps S1 and S2 is a substrate bonding/liquid-crystal-layer forming step of bonding the first substrate SB1 (particularly the surface Sf11) and the second substrate SB2 (particularly the surface Sf22) and forming the liquid crystal layer LQ therebetween. At the time of the bonding, the substrates are bonded in a frame region corresponding to the non-display area NDA by the bonding material BND or others. Note that the first alignment film AL1 and the second alignment film AL2 may be formed in this step.

The step S4 is the polymer-wall forming step. This step includes a step (UV-light emitting step) S41 of emitting the UV light UL to the first light blocking film BM1 or others through the light blocking mask MSK from above the second substrate SB2 in the Z direction as shown in FIG. 5. In this step, as the emission conditions of the UV light UL, predetermined light emission quantity, emission duration and others are controlled. As shown in FIG. 5, the emitted UV light UL penetrates the first light blocking film BM1, and reacts with the monomer-added liquid crystal ML below the first light blocking film BM1, so that the polymer wall PW is formed.

The manufacturing method of the first embodiment is the manufacturing method for the display apparatus 1, and includes the steps of forming the polymer wall PW arranged in the region below the first light blocking film BM1 in a plan view, the region overlapping the first light blocking film BM1, by emitting the UV light UL through the light blocking mask MSK from above the second substrate SB2 in the Z direction and making the reaction between the monomer-added liquid crystal ML of the liquid crystal layer LQ and the UV light UL penetrating the first light blocking film BM1 of the second substrate SB2.

[Cross-Sectional Configuration Example (1)]

Figure 8:
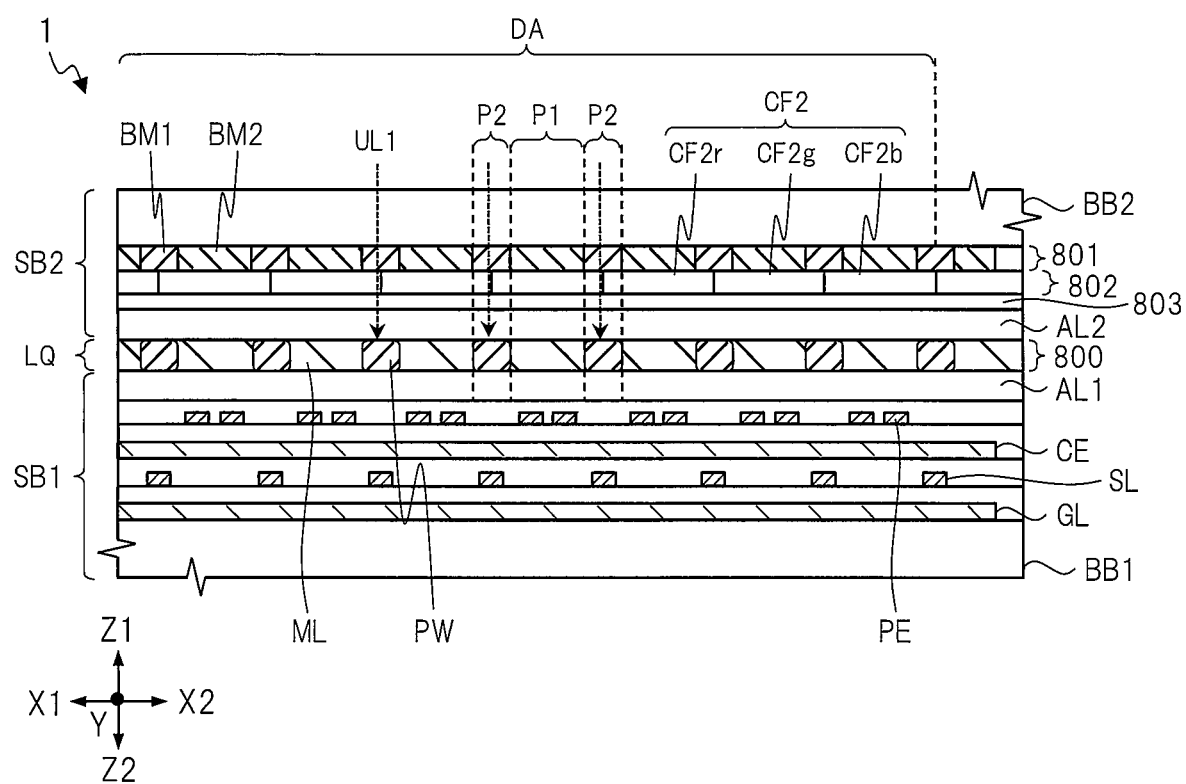
FIG. 8 is a diagram showing a more detailed cross-sectional configuration example in the display apparatus in the first embodiment.

FIG. 8 shows a cross-sectional configuration example of the display apparatus 1 of the first embodiment, which is more detailed than FIG. 5. FIG. 8 shows a schematic configuration of a cross section on the X-Z plane of the display area DA. In order to simultaneously explain the components, FIG. 8 shows one united cross section made of the cross sections at different positions. FIG. 8 shows the first substrate SB1, the liquid crystal layer LQ and the second substrate SB2 in this order from the lower side (Z2) in the Z direction. The first substrate SB1 includes a substrate BB1, the scan line GL, an insulating film, the signal line SL, an insulating film, the common electrode CE, an insulating film, the pixel electrode PE, an insulating film and the first alignment film AL1 in this order from the lower side (Z2) in the Z direction.

The substrate BB1 is a base substrate configuring the first substrate SB1, and is an insulating substrate having flexibility and light transmissivity. The substrate BB2 is a base substrate configuring the second substrate SB2, and is an insulating substrate having flexibility and light transmissivity. Each of the scan line GL and the signal line SL etc., is made of, for example, the conductive pattern such as a metallic wiring. The signal line SL is overlapped by the first light blocking film BM1 (the vertical black film of FIG. 6). The scan line GL is overlapped by the second light blocking film BM2 (the horizontal black film of FIG. 6). As the pixel electrode PE, the drawing shows a case of a pair of parallel-arranged electrodes for one pixel. The pixel electrode PE is made of a visible-light-transmitting conductive material such as ITO (Indium tin oxide). An insulating film is formed between the various electrodes or others.

The liquid crystal layer LQ is made of a layer 800 including the monomer-added liquid crystal ML and the polymer wall PW. This layer 800 is a layer between the first alignment film AL1 of the first substrate SB1 and the second alignment film AL2 of the second substrate SB2. Each of the first alignment film AL1 and the second alignment film AL2 is in contact with the layer 800, and has a function of controlling the alignment so that the liquid crystal molecules of the monomer-added liquid crystal ML have predetermined initial alignment. Each alignment film is made of, for example, an organic insulating film such as polyimide resin film. The polymer wall PW physically connects the first alignment film AL1 that is the lower (Z2) member and the second alignment film AL2 that is the upper (Z1) member in the Z direction. The polymer wall PW is formed in a region at a position below the first light blocking film BM1 through the second color filter CF2 or others in a plan view.

The second substrate SB2 includes a substrate BB2, a light blocking layer 801, a color filter layer 802, an insulating layer 803 and the second alignment film AL2 in this order from the upper side (Z1) in the Z direction. In the light blocking layer 801, the first light blocking film BM1 extending in the Y direction and the second light blocking film BM2 extending in the X direction are formed in a grid form as shown in FIG. 6. As described above, the first light blocking film BM1 and the polymer wall PW are arranged so as to correspond to the non-opening P2. When the polymer wall PW is also formed at the crossing point of the black film, note that only the first light blocking film BM1 is arranged at the crossing point. In the color filter layer 802, the color filter CF2 {CF2r, CF2g and CF2b} of the respective R, G and B colors are periodically arranged in the X direction as the second color filter CF2. The insulating layer 803 functions as a protection film for preventing diffusion of the color filter CF or others.

In the configuration example of FIG. 8, a part of the second color filter CF2 is arranged below the first light blocking film BM1 so as to overlap this film. The second color filter CF2 has conventional UV-light transmissivity, and therefore, may be arranged so as to overlap the first light blocking film BM1 in the Z direction as described above.

In the above-described step, the UV light UL (UL1) penetrates the light blocking mask MSK, the first light blocking film BM1, the second color filter CF2 and others, and is emitted to the monomer-added liquid crystal ML. In this manner, the polymer wall PW is formed in a region below the first light blocking film BM1, the region being between the first alignment film AL1 and the second alignment film AL2.

The cross-sectional configuration example of the display apparatus 1 is not limited to this, and any cross-sectional configuration is applicable. The light blocking film and the color filter may be basically made of a single layer that is the same, or two or more layers that are different. For example, the first light blocking film BM1 and the second light blocking film BM2 may be made of two layers that are different from each other. For example, the light blocking film and the color filter may be formed in the same layer. The color filters of three colors and the light blocking films of two types may be separated from each other through an insulating member.

As a composite material of the substrate having flexibility, for example, a resin material containing polymer made of polyimide, polyamide, poly carbonate, polyester or others is cited.

[Optical Property—First Light Blocking Film]

Figure 9:
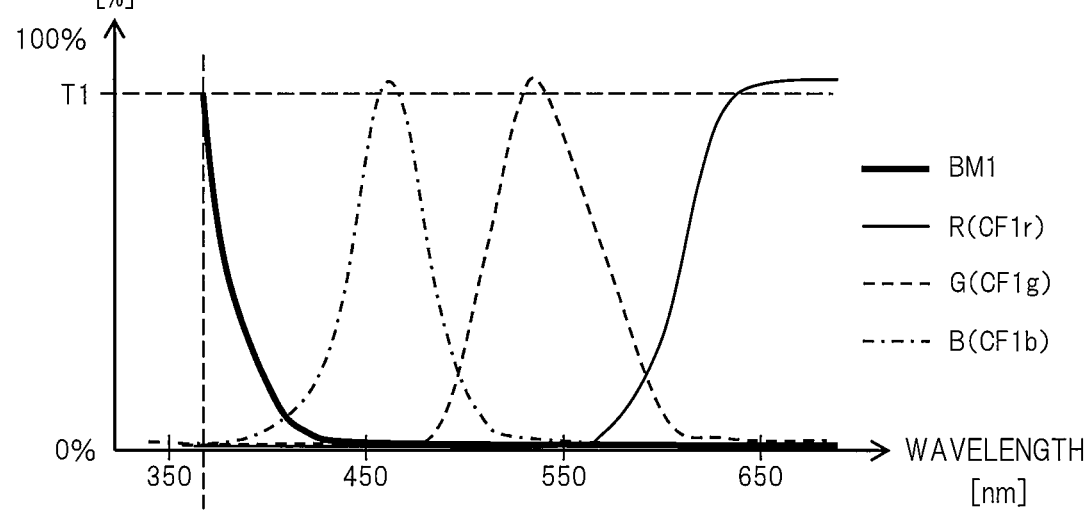
FIG. 9 is a diagram showing optical properties related to a first light blocking film in the first embodiment and a first color filter in a second embodiment.

FIG. 9 shows an optical property of the UV light with respect to the first light blocking film BM1 for use in the first embodiment and a first color filter CF1 for use in a second embodiment described later. In a graph of FIG. 9, a horizontal axis indicates a wavelength (unit [nm]) of the light, and a vertical axis indicates a normalized transmittance (unit [%]). The property of the first light blocking film BM1 is shown with a thick solid line. The property of the red (R) color filter CF1r is shown with a thin solid line. The property of the green (G) color filter CF1g is shown with a broken line. The property of the blue (B) color filter CF1b is shown with a dashed dotted line. Note that the normalized transmittance is a transmittance that is obtained by normalizing peak values of the transmittance of the light blocking film (the first light blocking film BM1) and the color filters of the respective colors so that the peak values are equal to one another.

A wavelength range of the UV light is generally a range of about 400 nm or smaller. A UV light wavelength (in other words, a monomer absorbing wavelength) for use in the polymer-wall forming step is set to be a wavelength within a wavelength range of 365 nm or smaller, such as to be 365 nm. In the graph of FIG. 9, a position of "the monomer absorbing wavelength=365 nm" is shown with a vertical broken line.

As premise, the first light blocking film BM1 has the light blocking property that is sufficient for the visible light (red color light, the green color light and the blue color light) so as to function as the black film. The first light blocking film BM1 is formed by using, for example, a resist member having the UV-light blocking property. In the graph of FIG. 9, the transmittance of the first light blocking film BM1 is close to 0% at wavelength regions (such as about 650 nm, about 550 nm and about 450 nm) corresponding to the R, G and B colors, respectively.

The normalized transmittance of the first light blocking film BM1 at the monomer absorbing wavelength (365 nm) is shown as "T1". In the display apparatus 1 of the first embodiment, the property of the UV-light-transmitting light blocking film for use as the first light blocking film BM1 is set so that the normalized transmittance of it at the monomer absorbing wavelength (365 nm) is higher than a normalized transmittance of the color filter CF (conventional second color filter CF2) (the normalized transmittance being particularly a transmittance of a member having the highest transmittance, such as the blue color filter CF2b, of the second color filter CF2). Particularly, the normalized transmittance T1 of the first light blocking film BM1 at the monomer absorbing wavelength (365 nm) is favorable when having a property with 10 or more times difference from the normalized transmittance of the blue color filter CF2b. Ideally, the normalized transmittance T1 of the first light blocking film BM1 at the monomer absorbing wavelength (365 nm) is better to be 100%. However, the transmittance is not limited to this. The certain effect can be obtained as long as the transmittance has a property satisfying the above-described conditions. The conditions of the UV-light emission in the polymer-wall forming step are adjusted in accordance with the UV-light transmissivity of the first light blocking film BM1.

[Effect and Others (1)]

As described above, according to the display apparatus 1 of the first embodiment, the formation of the polymer wall PW below the first light blocking film BM1 in the display area DA can secure the connection performance between the members in the thickness direction and reduce the change of the cell gap, and besides, achieve the favorable optical property such as the improvement of the aperture ratio. As described above, note that the polymer wall PW connects the first surface (surface Sf11) of the first substrate SB1 and the second surface (surface Sf22) of the second substrate SB2. The members corresponding to the first and second surfaces are not limited to the above-described alignment films, but may be any member of an electrode, a wiring, an insulating film a member of a different type or others.

Second Embodiment

Figure 10:
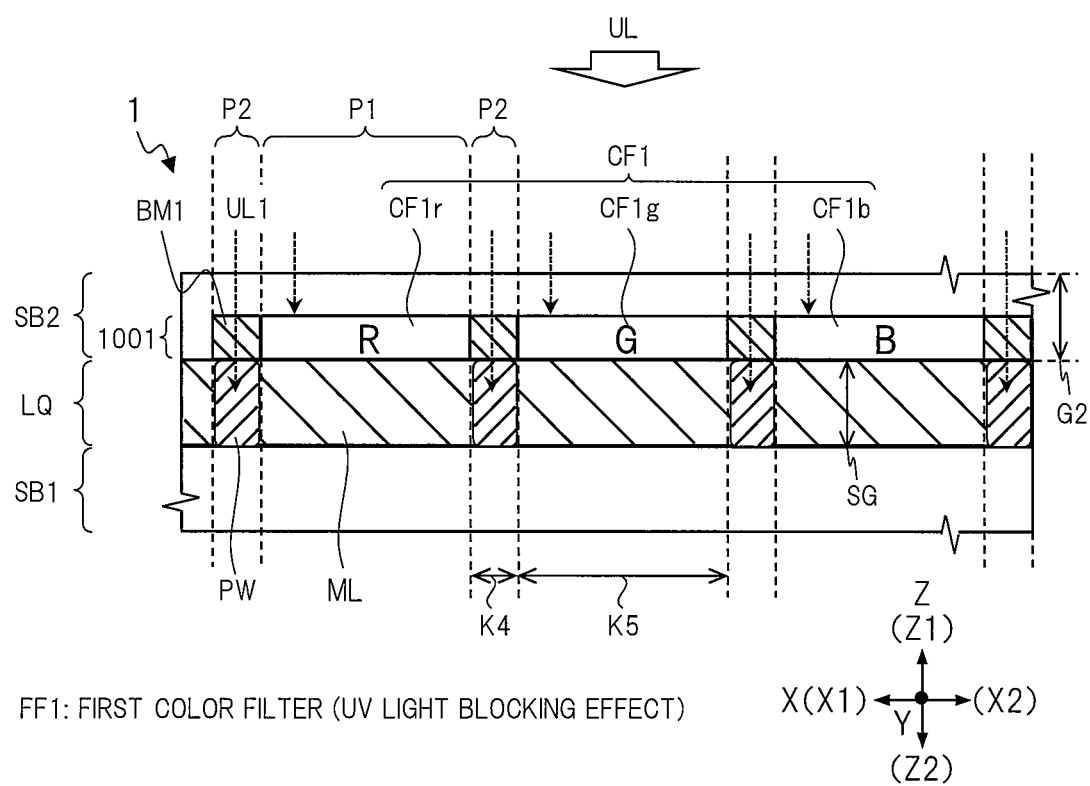
FIG. 10 is a diagram showing a cross-sectional configuration of the display area in the X direction in the state of the polymer-wall forming step in the display apparatus in the second embodiment of the present invention.
Figure 11:
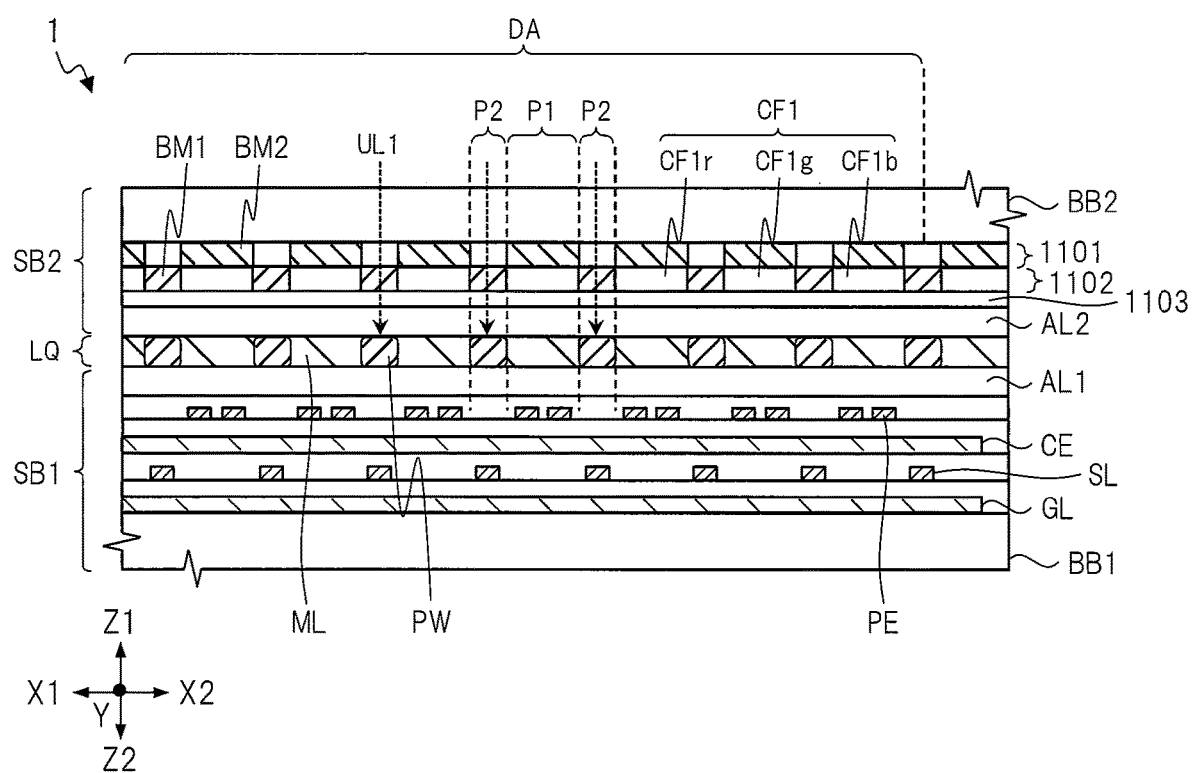
FIG. 11 is a diagram showing a state of a polymer-wall forming step as a cross-sectional configuration of a display area in an X direction in the second embodiment.

With reference to FIGS. 10 and 11, a display apparatus of a second embodiment will be explained. A basic configuration of the second embodiment and others is the same as that of the first embodiment, and differently-configured portions of the second embodiment and others from those of the first embodiment will be explained below. In the display apparatus of the second embodiment, as the color filter CF, not the conventional second color filter CF2 but the first color filter CF1 having the UV-light blocking property is used. In this manner, the light blocking mask MSK is unnecessary or reduced in the polymer-wall forming step.

[Cross-Sectional Configuration (2)]

FIG. 10 shows a cross-sectional configuration on the X-Z plane of the display area DA in the display apparatus 1 of the second embodiment. A different configuration point of FIG. 10 from that of FIG. 5 is a layer 1001 of the second substrate SB2, the layer including the first light blocking film BM1 arranged in the non-opening P2 and the first color filter CF1 arranged in the opening P1. In place of the second color filter CF2, the first color filter CF1 is arranged. The first color filter CF1 includes the color filters CF1r, CF1g and CF1b of the respective R, G and B colors. The first color filter CF1 has the UV-light blocking property as the optical property. Therefore, the first color filter Cf1 functions as the UV-light blocking region in the polymer-wall forming step. Therefore, in the manufacturing method of the second embodiment, the light blocking mask MSK is unnecessary or partially reduced in the polymer-wall forming step.

In the polymer-wall forming step, the UV light UL is emitted from the upper side (Z1) of the second substrate SB2 toward the lower side (Z2) in a plan view. The UV light UL penetrates the first light blocking film BM1 of the layer 1001 of the second substrate SB2, but does not penetrate the first color filter CF1. The UV light UL (UL1) penetrating the first light blocking film BM1 is emitted to the liquid crystal layer LQ. By the (polymerization) reaction in which the UV light UL (UL1) is absorbed by the monomers of the monomer-added liquid crystal ML, the monomers change to the polymer. In this manner, the polymer wall PW is formed in the region below the first light blocking film BM1, the region overlapping the first light blocking film BM1 in a plan view. The position of the polymer wall PW, the width K4 in the X direction and others are the same as those of the first embodiment (FIG. 5).

In the manufacturing method of the second embodiment (particularly in the case of the cross section of FIG. 10), the light blocking mask MSK is unnecessary. Therefore, in the polymer-wall forming step, a distance of the emission of the UV light UL in the Z direction can be set to the distance G2 as the smallest value corresponding to the thickness of the second substrate SB2. This distance G2 is smaller than the above-described distance G3. Therefore, in the manufacturing method of the second embodiment, the polymer wall PW can be easily formed, the process accuracy can be increased, and the load on the process can be reduced.

[Cross-Sectional Configuration Example (2)]

FIG. 11 shows a cross-sectional configuration example, that is more detailed than FIG. 10, on the X-Z plane in the display apparatus 1 of the second embodiment. A different configuration point of FIG. 11 from that of FIG. 8 is the second substrate SB2 including a layer 1101, a layer 1102 and an insulating layer 1103 on the substrate BB2 in this order from the upper side (Z1) to the lower side (Z2) in the Z direction. In the layer 1101, a conventional second light blocking film BM2 is arranged as the horizontal black film (similar to, for example, FIG. 6) in the region corresponding to the opening P1. In the layer 1102, the first light blocking film BM1 is arranged as the vertical black film (similar to, for example, FIG. 6) in the region corresponding to the non-opening P2. Similarly, in the layer 1102, the first color filter CF1 {CF1r, CF1g and CF1b} is arranged in the region corresponding to the opening P1, the region being between the first light blocking films BM1.

In the configuration example of FIG. 11, the black film that is the grid-form light blocking film is made of two layers that are the layer 1101 and the layer 1102. When the polymer wall PW is formed also at the crossing point of the grid of the black film, note that only the first light blocking film BM1 is arranged at the crossing point. In the configuration example of FIG. 11, below the first light blocking film BM1 in the Z direction, the color filter CF (first color filter CF1) does not overlap the first light blocking film BM1. The first color filter CF1 has the UV-light blocking property, and therefore, is arranged so as not to overlap the region of the first light blocking film BM1 corresponding to the region where the polymer wall PW is supposed to be formed.

In the polymer-wall forming step corresponding to the structure of FIG. 11, the UV light UL that is emitted from above the second substrate SB2 penetrates only the first light blocking film BM1. The UV light UL (UL1) reacts with the monomer-added liquid crystal ML of the liquid crystal layer LQ, so that the polymer wall PW is formed in the region below the first light blocking film, the region overlapping the first light blocking film.

[Optical Property—First Color Filter]

As the property of the UV-light blocking color filter that is the first color filter CF1 for use in the second embodiment in FIG. 9, the normalized transmittance at the monomer absorbing wavelength (365 nm) is close to 0% while the sufficient transmittance for the wavelength ranges of the respective colors is secured as premise. In other words, the color filter has the sufficient light blocking property for the UV light. The first color filter CF1 is configured by using, for example, a color resist member having the UV-light blocking property.

[Manufacturing Method (2)]

A manufacturing method of the second embodiment includes a step of forming the polymer wall PW arranged in the region below the first light blocking film BM1, the region overlapping the first light blocking film BM1, by emitting the UV light from above the second substrate SB2 and making the reaction between the monomer-added liquid crystal ML of the liquid crystal layer LQ and the UV light not penetrating the first color filter CF1 having the UV-light blocking property but penetrating the first light blocking film BM1.

[Effect and Others (2)]

As described above, according to the display apparatus 1 of the second embodiment, the same effect as that of the first embodiment can be obtained, the light blocking mask MSK in the step can be unnecessary or reduced, and the load on the step can be reduced.

As modification examples of the second embodiment, the followings are also applicable. The modification example may be configured so that color filters CF of two types that are the first color filter CF1 and the second color filter CF2 are used together. For example, the second color filter CF2 may be arranged in a region where the UV light UL is supposed to penetrate for forming the polymer wall PW while the first color filter CF1 may be arranged in a region where the UV light UL is not supposed to penetrate.

As a modification example, the light blocking mask MSK and the first color filter CF1 may be used in combination in the polymer-wall forming step. In other words, the light blocking mask MSK may handle the UV light blocking in one region while the first color filter CF1 may handle the UV light blocking in the other region.

Third Embodiment

Figure 12:
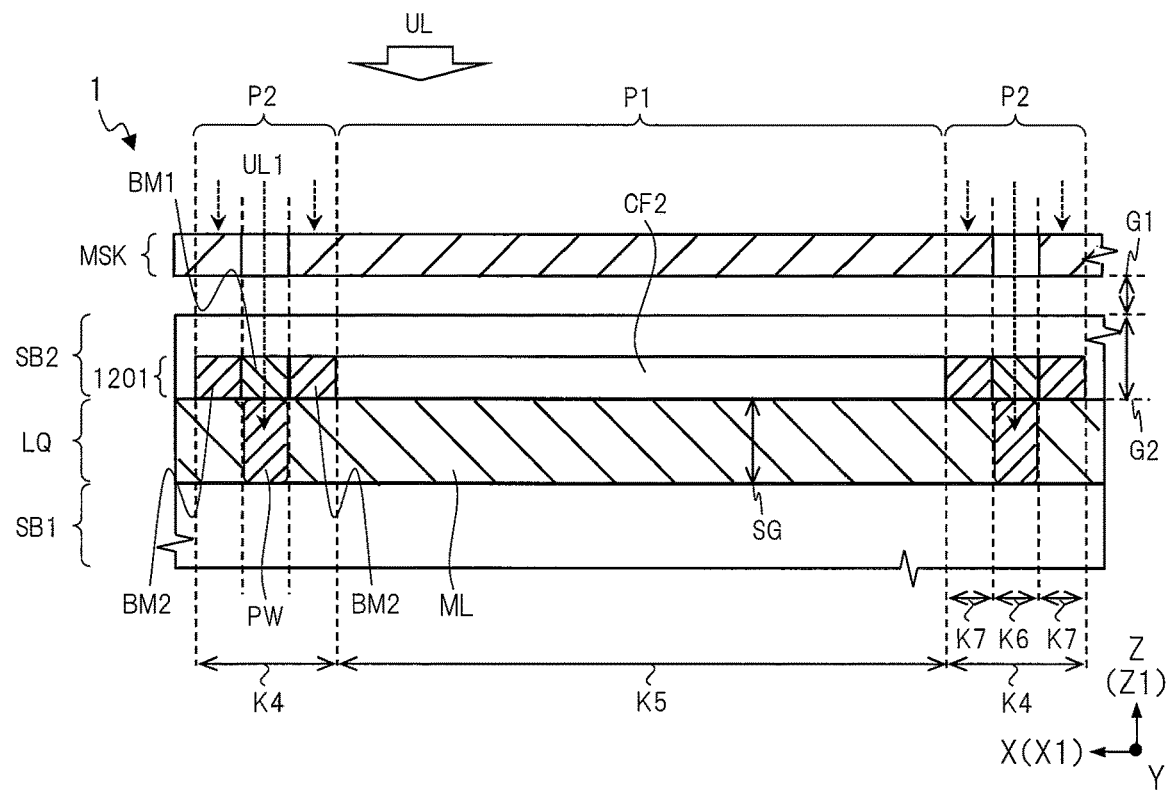
FIG. 12 is a diagram showing a cross-sectional configuration of the display area in the X direction in the state of the polymer-wall forming step regarding a first mode configuration in a display apparatus in a third embodiment of the present invention.
Figure 13:
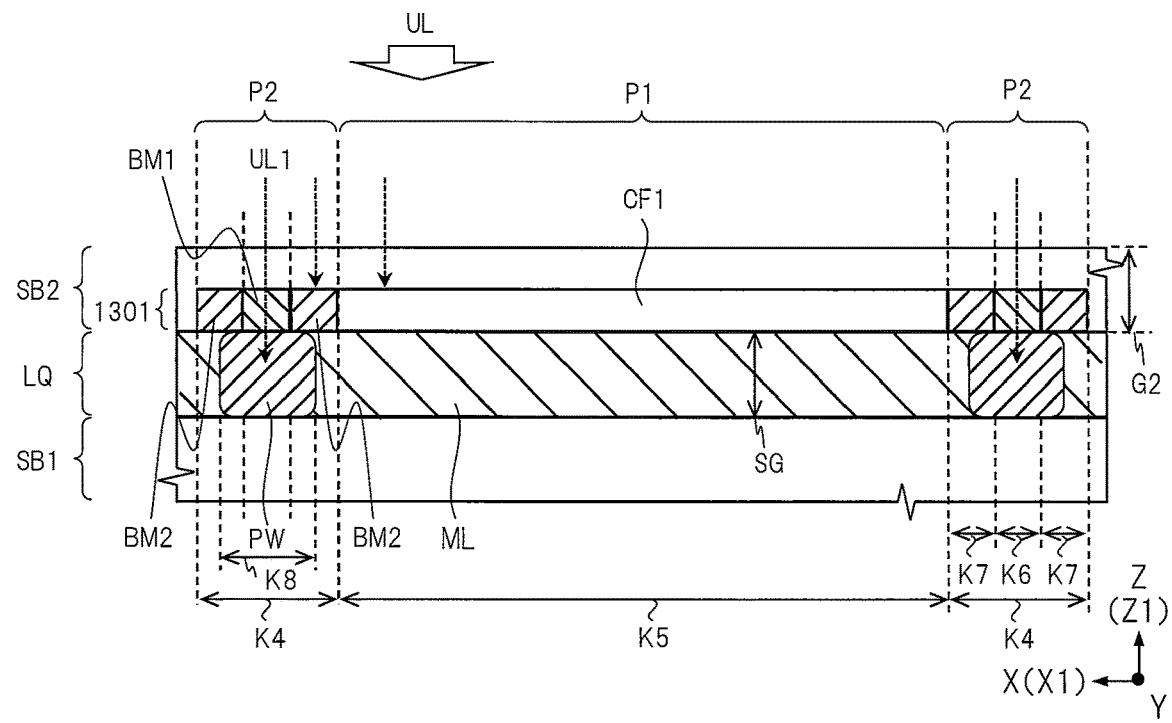
FIG. 13 is a diagram showing a cross-sectional configuration of the display area in the X direction in the state of the polymer-wall forming step regarding a second mode configuration in the display apparatus in the third embodiment.

With reference to FIGS. 12 and 13, a display apparatus of a third embodiment will be explained. In a structure of the display apparatus of the third embodiment, the first light blocking film BM1 and the conventional second light blocking film BM2 are used together. In this manner, the region of the polymer wall PW that is formed to correspond to the first light blocking film BM1 can be narrowed. An area and an amount of the formed light blocking film BM1 can be reduced.

The configuration of FIG. 5 in the first embodiment and the configuration of FIG. 10 in the second embodiment have a risk of formation of the polymer wall PW that partially protrudes from the non-opening P2 into the opening P1 when the emission conditions of the UV light cannot be appropriately controlled in the polymer-wall forming step. In such a case, the aperture ratio of the liquid crystal cell and the pixel decreases by the protrusion. In the third embodiment, even when the polymer wall PW is formed so as to partially protrude horizontally (in the X or Y direction) from the region below the first light blocking film BM1, the polymer wall PW is prevented from protruding into the opening P1 by the parallel arrangement of the first light blocking film BM1 and the second light blocking film BM2. In this manner, the aperture ratio can be secured.

[Cross-Sectional Configuration (3)]

FIG. 12 shows a cross-sectional configuration on the X-Z plane of the display apparatus 1 of the third embodiment. FIG. 12 shows a cross-sectional configuration of a first mode of the third embodiment. FIG. 13 shows a cross-sectional configuration of a second mode of the third embodiment. In the first mode of FIG. 12, the display apparatus 1 includes the first substrate SB1, the liquid crystal layer LQ and the second substrate SB2 in this order from the lower side (Z2) in the Z direction. In the example of FIG. 12, the second color filter CF2 is used as the color filter CF. Correspondingly, the light blocking mask MSK is used in the polymer-wall forming step.

The second substrate SB2 includes a layer 1201. In the layer 1201, the second color filter CF2 is arranged in a region (having a width K5 in the X direction) corresponding to the opening P1. The first light blocking film BM1 and the second light blocking film BM2 are arranged in parallel in a region (having a width K4 in the X direction) corresponding to the non-opening P2. The first light blocking film BM1 is arranged at a center position of the non-opening P2 in the X direction between certain pixels. The second light blocking film BM2 is arranged at positions of both right and left sides of the first light blocking film BM1 in the X direction. In the width K4 of the non-opening P2 in the X direction, a width K6 of a region of the first light blocking film BM1 and a width K7 of a region of the second light blocking film BM2 are shown. A relation of "K6+2×K7=K4" is established.

The light blocking mask MSK is arranged at a position that is away by the predetermined distance G1 from the second substrate SB2 as similar to the above description. In the light blocking mask MSK, an opening that is the UV-light transmitting region is formed at a position corresponding to the first light blocking film BM1. Note that the conventional second light blocking film BM2 has the UV-light blocking property, and therefore, may be the opening even in the region of the light blocking mask MSK, the region corresponding to the second light blocking film BM2.

In the polymer-wall forming step, the UV light UV (UL1) that is the component penetrating the opening of the light blocking mask MSK in the UV light UL that is emitted from the upper side (Z1) in the Z direction is emitted to the layer 1201 including the first light blocking film BM1. The UV light UL (UL1) penetrates the first light blocking film BM1 but does not penetrate the second light blocking film BM2. The UV light UL (UL1) penetrating downward the first light blocking film BM1 in the Z direction is emitted to the monomer-added liquid crystal ML of the liquid crystal layer LQ. In this manner, the polymer wall PW is formed in the region below the first light blocking film BM1, the region overlapping the first light blocking film. A state of FIG. 12 shows the final shape (that is a result of the control in accordance with the emission conditions) of the polymer wall PW. The polymer wall PW is not formed in the region below the second light blocking film BM2, the region overlapping the second light blocking film. The polymer wall PW stays inside the non-opening P2, and does not protrude into the opening P1. Therefore, the aperture ratio can be secured. The width of the polymer wall PW in the X direction is within the width K4 of the non-opening P2, and is particularly the same as the width K6 of the first light blocking film BM1.

In the example of the second mode of FIG. 13, the first color filter CF1 is used as the color filter CF. Accordingly, in the polymer-wall forming step, the light blocking mask MSK can be unnecessary or partially reduced. The second substrate SB2 includes a layer 1301. In the layer 1301, the first color filter CF1 is arranged in a region (having the width K5 in the X direction) corresponding to the opening P1. The first light blocking film BM1 and the second light blocking film BM2 are arranged in parallel in a region (having the width K4 in the X direction) corresponding to the non-opening P2. As similar to the first mode, the first light blocking film BM1 is arranged at the center position of the non-opening P2 in the X direction while the second light blocking film BM2 is arranged at the positions of both right and left sides of the first light blocking film BM1 in the X direction.

In the polymer-wall forming step, the UV light UL that is emitted from the upper side (Z1) in the Z direction is emitted to the layer 1301 including the first light blocking film BM1. The UV light UL penetrates the first light blocking film BM1 but does not penetrate the second light blocking film BM2. The UV light UL (UL1) penetrating downward the first light blocking film BM1 in the Z direction is emitted to the monomer-added liquid crystal ML of the liquid crystal layer LQ. In this manner, the polymer wall PW is formed in the region below the first light blocking film BM1, the region overlapping the first light blocking film. A state of FIG. 13 shows the final shape of the polymer wall PW. At this stage, in the case of the emission conditions of the UV light UL in the second mode, the polymer wall PW is grown so as to protrude horizontally (in the X or Y direction) from the region having the width K6 below the first light blocking film BM1 into the region having the width K7 below the second light blocking film BM2, the region overlapping the second light blocking film. A width K8 of the formed polymer wall PW in the X direction is shown. The width K8 is smaller than the width K4 of the non-opening P2 (K8<K4). The polymer wall PW does not protrude into the opening P1. Therefore, the aperture ratio can be secured.

[Manufacturing Method (3)]

A manufacturing method of the third embodiment includes a step of forming the polymer wall PW arranged in the region below the first light blocking film BM1, the region overlapping the first light blocking film BM1, by emitting the UV light UL from above the second substrate SB2 and making the reaction between the monomer-added liquid crystal ML of the liquid crystal layer LQ and the UV light UL not penetrating the second light blocking film BM2 with the UV-light blocking property but penetrating the first light blocking film BM1.

[Effect and Others (3)]

As described above, according to the third embodiment, the polymer wall PW can be formed so as to stay inside the non-opening P2 and so as not to protrude into the opening P1 because of the simultaneous usage of the two-type light blocking films, and therefore, the aperture ratio can be secured. When it is difficult to control the emission of the UV light UL, a margin for the final shape of the polymer wall PW can be generated by the application of the second mode as shown in FIG. 13. In the case of the second mode, the width K8 of the final shape of the polymer wall PW may be within the width K4 of the non-opening P2. In other words, there is no problem for the horizontally-expanding formation of the polymer wall PW having a certain distance. In other words, the polymer-wall forming step can be easier to be controlled.

In the third embodiment, a degree of freedom of the formation pattern of the polymer wall PW can be increased in accordance with the pattern of the two-type light blocking films. In the third embodiment, when the area or the amount of the first light blocking film BM1 is supposed to be reduced, the reduction can be achieved by the combination with the second light blocking film BM2. When the first light blocking film BM1 and the second light blocking film BM2 are different from each other in the visible-light blocking property, the predetermined visible-light blocking property can be achieved by the combined arrangement of the two light blocking films. For example, when the conventional second light blocking film BM2 is formed next to the first light blocking film BM1, the light leakage at the pixel can be reduced, and the effect capable of improving the contrast or others can be expected.

As a modification example of the third embodiment, the following is also applicable. The arrangement formation of the two-type light blocking films at the non-opening P2 is not limited to the structure of FIG. 12, and any formation is applicable. For example, a structure in which the first light blocking film BM1 is arranged in a region on one side (such as right-half region) of the non-opening P2 in the X direction between the certain pixels while the second light blocking film BM2 is arranged in a region on the other side (such as left-half region) of the same is also applicable.

Fourth Embodiment

Figure 14:
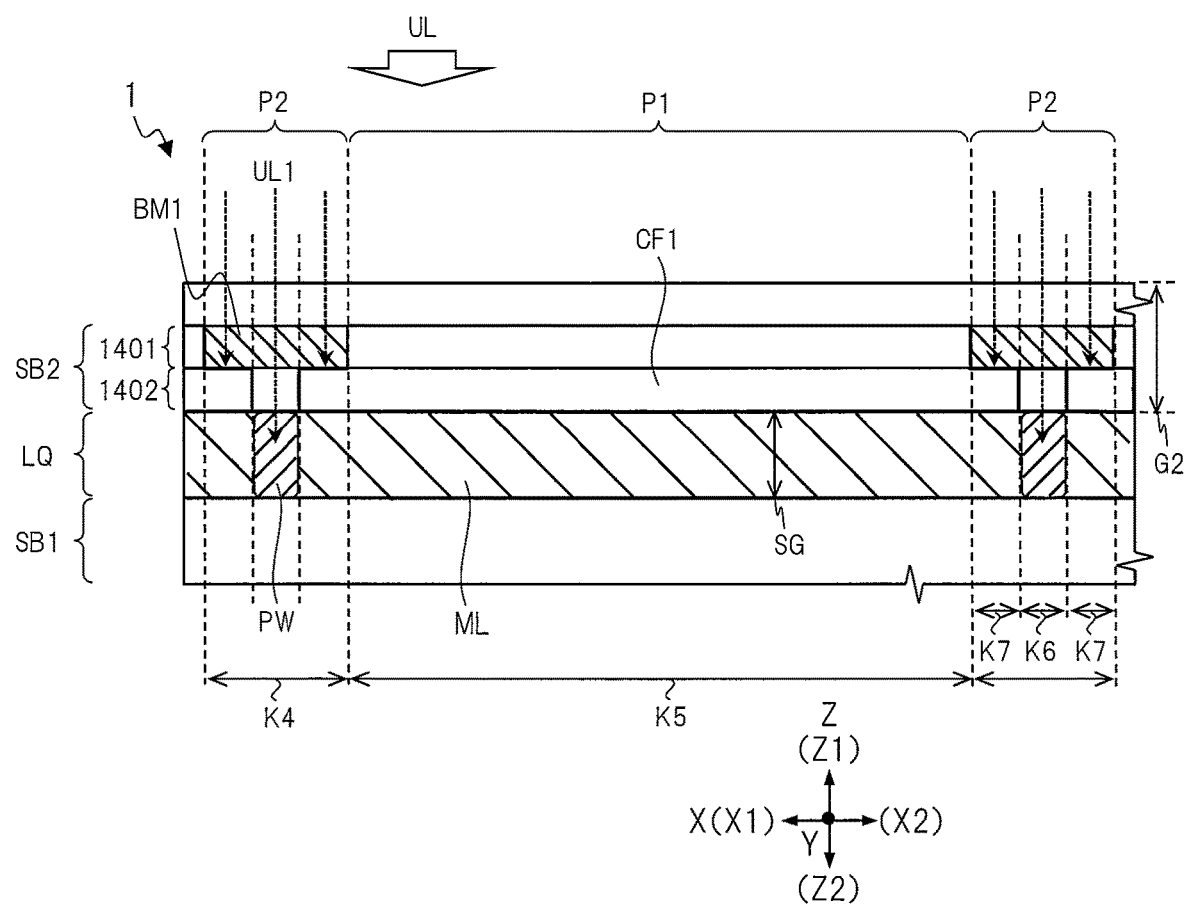
FIG. 14 is a diagram showing a cross-sectional configuration of the display area in the X direction in the state of the polymer-wall forming step in a display apparatus in a fourth embodiment of the present invention.

With reference to FIG. 14, a display apparatus of a fourth embodiment will be explained. In the fourth embodiment, the first light blocking film BM1 and the color filter CF1 are used together, and a partial region in a plan view is structured so that the color filter CF1 overlaps the first light blocking film BM1. In this manner, the partial region functions as the UV-light blocking region because of the first color filter CF1 having the UV-light blocking property. In this manner, in the polymer-wall forming step, the light blocking mask MSK can be unnecessary or reduced. The configuration of the fourth embodiment can be interpreted as a configuration in which the first color filter CF1 is arranged in place of the second light blocking film BM2 in the configuration of the third embodiment.

[Cross-Sectional Configuration (4)]

FIG. 14 shows a cross-sectional configuration on the X-Z plane in the display apparatus 1 of the fourth embodiment. A different configuration point of FIG. 14 from the above-described configurations is the second substrate SB2 including a layer 1401 and a layer 1402 in this order from the upper side (Z1) in the Z direction. In the layer 1401 that is a light blocking layer, the first light blocking film BM1 is arranged in the region corresponding to the non-opening P2. In the layer 1402 that is a color filter layer, the first color filter CF1 is arranged in the region corresponding to the opening P1 and a partial region of the non-opening P2. The single first light blocking film BM1 is arranged in the region where the polymer wall PW is supposed to be formed, and the first light blocking film BM1 and the first color filter CF1 are arranged so as to overlap in the region where the polymer wall PW is not supposed to be formed (or the region for use in the margin for the formation).

In the fourth embodiment, the first color filter CF1 is used. Accordingly, the light blocking mask MSK is unnecessary in the cross section of FIG. 14. In the polymer-wall forming step, the UV light UL that is emitted from above the second substrate SB2 penetrates a part (having the width KG) of the first light blocking film BM1 of the layer 1401 of the second substrate SB2 but does not penetrate the first color filter CF1 (having the width K7) of the layer 1402. The region having the width K4 of the first light blocking film BM1 includes a region having a width K6 not overlapping the first color filter CF1. The UV light UL (UL1) penetrates this region (in other words, a region between the first color filters CF1 in the X direction). The region having the width K4 of the first light blocking film BM1 includes a region having a width K7 overlapping the first color filter CF1. In this region (in other words, the region where these components overlap in a plan view), the UV light UL does not penetrate a portion corresponding to the first color filter CF1. Therefore, the UV light UL (UL1) that has penetrated only the predetermined region (having the width K6) of the first light blocking film BM1 is emitted to the liquid crystal layer LQ. By the reaction between the UV light and the monomer-added liquid crystal ML, the polymer wall PW is formed in a region below the region having the predetermined width K6 of the first light blocking film BM1, the regions overlapping each other. The configuration example of FIG. 14 shows a case in which the width of the final shape in the X direction in the formation of the polymer wall PW is the same as the width K6.

As similar to FIG. 13 described above, the polymer wall PW is not limited to the above-described configuration example, and may be formed so as to protrude to a portion below the partial region (having the width K7) of the first color filter CF1.

[Manufacturing Method (4)]

A manufacturing method of the fourth embodiment includes a step of forming the polymer wall PW arranged in the region below the first light blocking film BM1, the region overlapping the first light blocking film BM1, by emitting the UV light UL from above the second substrate SB2 and making the reaction between the monomer-added liquid crystal ML of the liquid crystal layer LQ and the UV light UL not penetrating the partial region (the region overlapping the first light blocking film BM1) of the first color filter CF1 having the UV-light blocking property but penetrating the partial region (the region not overlapping the first color filter CF1) of the first light blocking film BM1.

[Effect and Others (4)]

As described above, according to the fourth embodiment, the similar effect to that of the third embodiment, in other words, the effect capable of forming the polymer wall PW so as to stay inside the non-opening P2 to secure the aperture ratio or others can be achieved. In the fourth embodiment, the polymer wall PW can be formed at a predetermined point in accordance with the arrangement pattern in combination of the first light blocking film BM1 (in other words, the UV-light transmitting but visible-light blocking region) and the first color filter CF1 (in other words, the UV-light blocking but visible-light transmitting region).

Fifth Embodiment

With reference to FIGS. 15 to 18, a display apparatus of a fifth embodiment will be explained. In the display apparatus of the fifth embodiment, a spacer serving as a protrusion and the polymer wall PW are formed below the first light blocking film BM1 in the Z direction in the liquid crystal layer LQ in a plan view of the display area DA. In this configuration, since the polymer wall PW is formed around the spacer, a volume of the polymer wall PW can be smaller than those of the above-described embodiments. Therefore, the emission light quantity and the emission duration of the UV light in the polymer-wall forming step can be reduced, so that the manufacturing flow can be shortened.

[Cross-Sectional Configuration (5)]

Each of FIGS. 15 to 18 shows a cross-sectional configuration on the X-Z plane in the display apparatus 1 of the fifth embodiment. In the fifth embodiment, the polymer wall PW connects a surface of the top portion of the first alignment film AL1 in the Z direction in the first substrate SB1 and a surface of the bottom portion of the second alignment film AL2 in the Z direction in the second substrate SB2.

Figure 15:
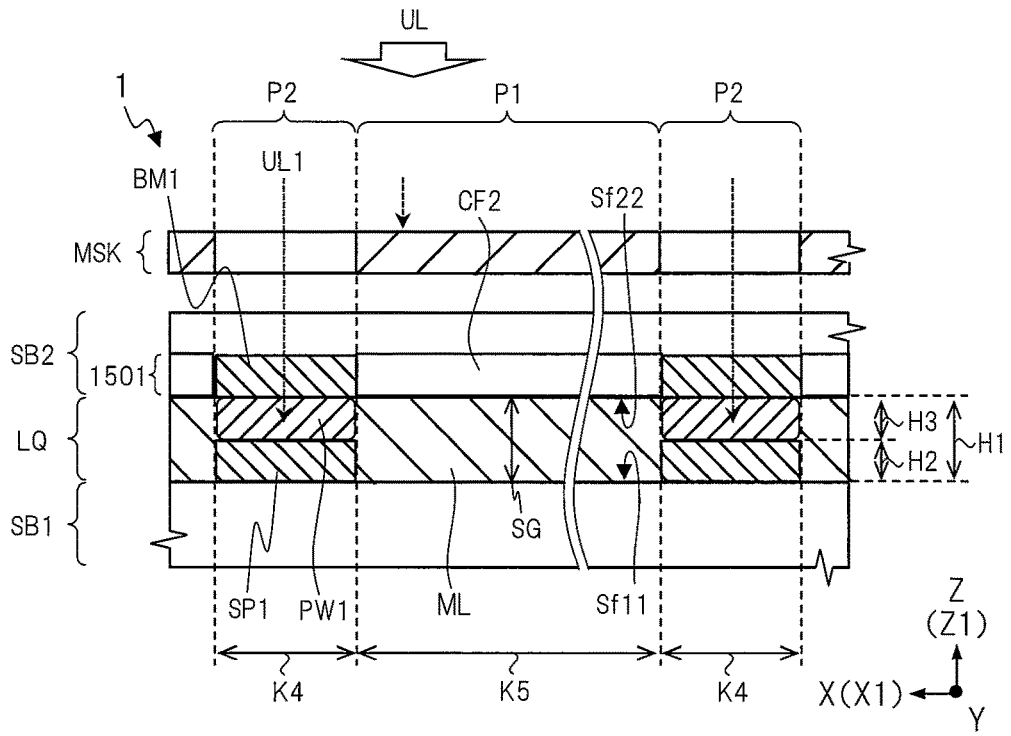
FIG. 15 is a diagram showing a cross-sectional configuration of the display area in the X direction in the state of the polymer-wall forming step regarding a first mode configuration in a display apparatus in a fifth embodiment of the present invention.

FIG. 15 shows a configuration example of the polymer wall PW of the first mode in the fifth embodiment. In a layer 1501 of the second substrate SB2, the first light blocking film BM1 is arranged so as to correspond to the non-opening P2, and the second color filter CF2 is arranged so as to correspond to the opening P1.

In this configuration example, a spacer SP1 serving as the protrusion is formed so as to be connected to the lower surface (Z2) of the liquid crystal layer LQ (the surface Sf11 of the corresponding first substrate SB1) in the Z direction. The spacer SP1 serving as the protrusion is a portion protruding into the liquid crystal layer LQ in the Z direction and being connected to either surface (such as the surface Sf11) of the surface Sf11 of the first substrate SB1 and the surface Sf22 of the second substrate SB2. This spacer SP1 is made as a publicly-known post spacer (also referred to as main spacer or others). This spacer SP1 has, for example, a columnar shape, but may have a different shape. This spacer SP1 has predetermined elasticity, and is made of a member having the visible-light blocking property.

As this spacer SP1, not only the post spacer but also a sub spacer is applicable, or various spacers may be mixed. The post spacer is a member that reduces the distance (cell gap) of the liquid crystal cell and the pixel in the Z direction at a position of this post spacer so as to be smaller than a distance at a different position without the post spacer, and is a member for use in securing the predetermined distance. The sub spacer is lower in height than the main spacer. At the position with the spacer SP1 in the display area DA, the minimum cell gap corresponding to the thickness of this spacer SP1 is maintained. For example, even when at least either the first substrate SB1 or the second substrate SB2 that are arranged on the upper and lower sides in the Z direction is deflected so as to be pushed toward the liquid crystal layer LQ on the inner side, the cell gap corresponding to the thickness of this spacer SP1 is maintained.

The spacer SP1 may be formed in a first-substrate manufacturing step (S1 of FIG. 7) or a step (S3) of forming the liquid crystal layer LQ. More specifically, the spacer SP1 is formed in a shape, for example, connected to the first alignment film AL1 on the lower side (Z2) in the Z direction but not connected to the second alignment film AL2 on the upper side (Z1) in FIG. 8.

In this configuration example, below (Z2) the first light blocking film BM1 having the width K4 of the non-opening P2, the spacer SP1 having the same width K4 is formed. The thickness of the liquid crystal layer LQ in the Z direction is schematically shown as a thickness "H1". The spacer SP1 has a thickness "H2" that is smaller than the thickness H1. A region above (Z1) the spacer SP1 in the Z direction has a thickness "H3". A relation of "H2+H3=H1" is established.

In this configuration example, a case of usage of the second color filter CF2 as the color filter CF and usage of the light blocking mask MSK in the step will be described. In the polymer-wall forming step, the UV light UL is emitted through the light blocking mask MSK. The UV light UL penetrates the region of the first light blocking film BM1 in a plan view. The UV light UL (UL1) reacts with the monomer-added liquid crystal ML existing around a portion of the spacer SP1 including the region above the spacer SP1 in the liquid crystal layer LQ. In this manner, a polymer wall PW1 is formed around the portion of the spacer SP1 including the region having the thickness H3 above the spacer SP1. This polymer wall PW1 has the thickness H3 in the Z direction. This polymer wall PW1 is formed so as to be connected to at least an upper surface of the spacer SP1 and the surface Sf22 of the second substrate SB2 (more specifically, the surface of the second alignment film AL2). Therefore, this polymer wall PW1 has a predetermined function of connecting the upper and lower members. Since this polymer wall PW1 is inside the non-opening P2, the aperture ratio is secured. Note that a case of usage of the first color filter CF1 as the color filter CF to eliminate the light blocking mask MSK is similarly applicable.

In this configuration example, the volume of the formed polymer wall PW can be made smaller than that of the configuration without the spacer in the liquid crystal layer LQ having the thickness H1. Therefore, the emission duration of the UV light in the step or others can be reduced, so that the manufacturing flow can be shortened.

Figure 16:
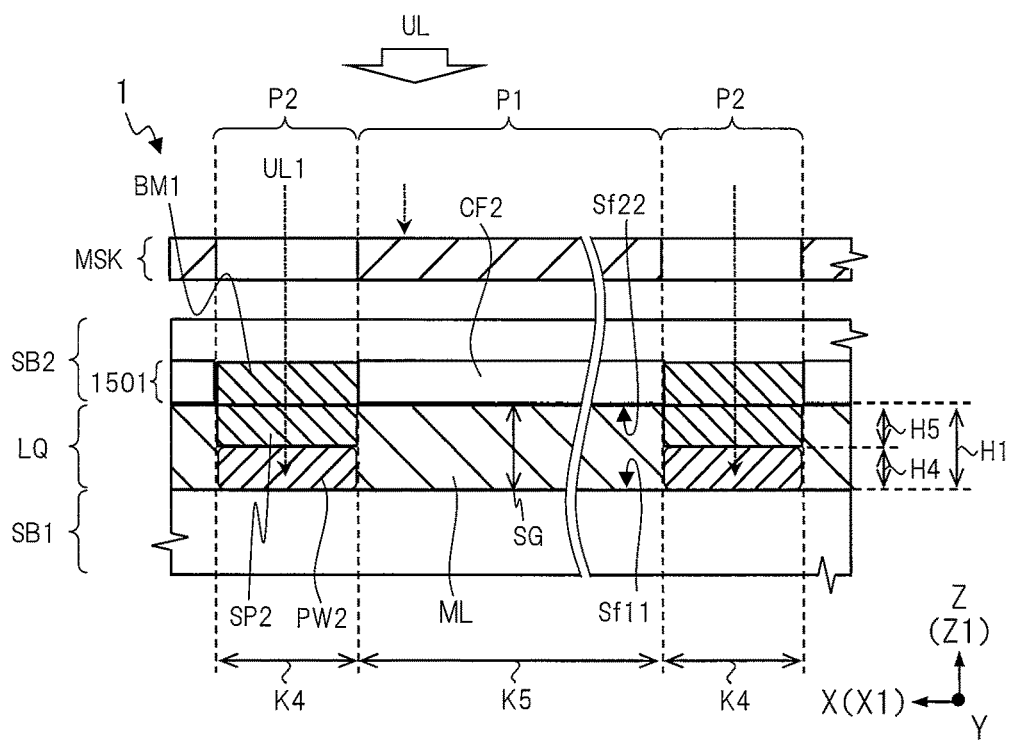
FIG. 16 is a diagram showing a cross-sectional configuration of the display area in the X direction in the state of the polymer-wall forming step regarding a second mode configuration in the display apparatus in the fifth embodiment.

FIG. 16 shows a configuration example of the polymer wall PW of the second mode in the fifth embodiment. The second mode is a modification example of the first mode. As a different configuration point of the second mode, a spacer SP2 is formed in an upper region (Z1) of the liquid crystal layer LQ in the Z direction while a polymer wall PW2 is formed in a lower region (Z2). In this configuration example, the spacer SP2 is formed in the liquid crystal layer LQ so as to be connected to the surface Sf22 of the second substrate SB2 on the upper side (Z1) in the Z direction. The spacer SP2 has, for example, a columnar shape, but may have a different shape. This spacer SP2 has predetermined elasticity, and is made of a member having the visible-light blocking property. In addition, this spacer SP2 particularly has the UV-light transmitting property.

The spacer SP2 may be formed in a second-substrate manufacturing step (S2 of FIG. 7) or the step (S3) of forming the liquid crystal layer LQ. More specifically, the spacer SP2 is formed in a shape, for example, connected to the second alignment film AL2 on the upper side (Z1) in the Z direction but not connected to the first alignment film AL1 on the lower side (Z2) in FIG. 8.

In this configuration example, below (Z2) the first light blocking film BM1 having the width K4 of the non-opening P2, the spacer SP2 having the same width K4 is formed. The spacer SP2 has a thickness "H5" that is smaller than the thickness H1 of the liquid crystal layer LQ. A region below the spacer SP2 in the Z direction has a thickness "H4". A relation of "H4+H5=H1" is established.

In the polymer-wall forming step, the UV light UL is emitted through the light blocking mask MSK. The UV light UL penetrates the region of the first light blocking film BM1 in a plan view. Further, the UV light UL (UL1) penetrates the region of the spacer SP2 in the liquid crystal layer LQ. The UV light UL (UL1) reacts with the monomer-added liquid crystal ML existing in a region around a portion of the spacer SP2 including the region below the spacer SP2. In this manner, the polymer wall PW2 is formed around the portion of the spacer SP2 including the region having the thickness H4 below the spacer SP2. This polymer wall PW2 is formed so as to be connected to at least a lower surface of the spacer SP2 and the surface Sf11 of the first substrate SDI (more specifically, the surface of the first alignment film AL1). Therefore, this polymer wall PW2 has a predetermined function of connecting the upper and lower members. Since this polymer wall PW2 is inside the non-opening P2, the aperture ratio is secured.

Figure 17:
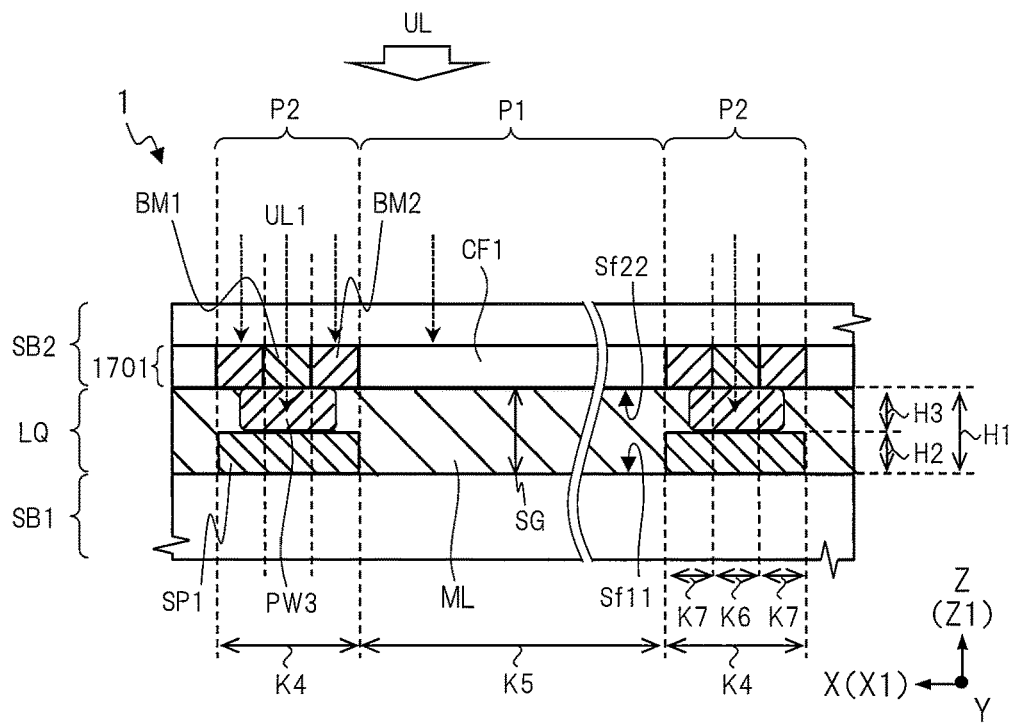
FIG. 17 is a diagram showing a cross-sectional configuration of the display area in the X direction in the state of the polymer-wall forming step regarding a third mode configuration in the display apparatus in the fifth embodiment.

FIG. 17 shows a configuration example of the polymer wall PW of a third mode in the fifth embodiment. The third mode is equivalent to a mode of combination of the first mode and the third embodiment. In a layer 1701 of the second substrate SB2, the first light blocking film BM1 and the second light blocking film BM2 are arranged in parallel so as to correspond to the non-opening P2, and the first color filter CF1 is arranged so as to correspond to the opening P1. The first light blocking film BM1 is arranged in a region (having the width K6) at a center position of the non-opening P2, and the second light blocking film BM2 is arranged in regions (having the width K7) on both sides of this first light blocking film BM1. In this configuration example, a case of usage of the first color filter CF1 as the color filter CF to eliminate the light blocking mask MSK will be described.

In this configuration example, a spacer SP1 (such as a post spacer) is formed in the liquid crystal layer LQ so as to be connected to the surface Sf11 of the first substrate SB1 on the lower side (Z2) in the Z direction. Below (Z2) the non-opening P2 with the width K4, the spacer SP1 with the same width K4 is formed. The width K4 of the spacer SP1 is larger than the width K6 of the first light blocking film BM1.

In the polymer-wall forming step, the emitted UV light UL penetrates the region of the first light blocking film BM1 in a plan view but does not penetrate the region of the second light blocking film BM2 and the first color filter CF1. The UV light UL (UL1) reacts with the monomer-added liquid crystal ML mainly existing in a region having the width H3 above the spacer SP1. In this manner, a polymer wall PW3 is formed around the portion of the spacer SP1 including the region having the thickness H3 above the spacer SP1. This polymer wall PW3 is formed so as to be connected to at least an upper surface of the spacer SP1 and the surface Sf22 of the second substrate SB2 (more specifically, the surface of the second alignment film AL2). Therefore, this polymer wall PW3 has a predetermined function of connecting the upper and lower members. An end of this polymer wall PW3 in the X direction is at a position within the width K7 of the second light blocking film BM2. A width of this polymer wall PW3 in the X direction is within the width K4 of the non-opening P2. Since this polymer wall PW3 is inside the non-opening P2, the aperture ratio is secured.

As described above, in the configuration example of the third mode, the volume of the polymer wall PW3 can be reduced in addition to the similar effect of the third embodi-ment, and the polymer wall PW3 can be selectively formed in a partial region of the spacer SP1 (having the width K4) in a plan view.

Figure 18:
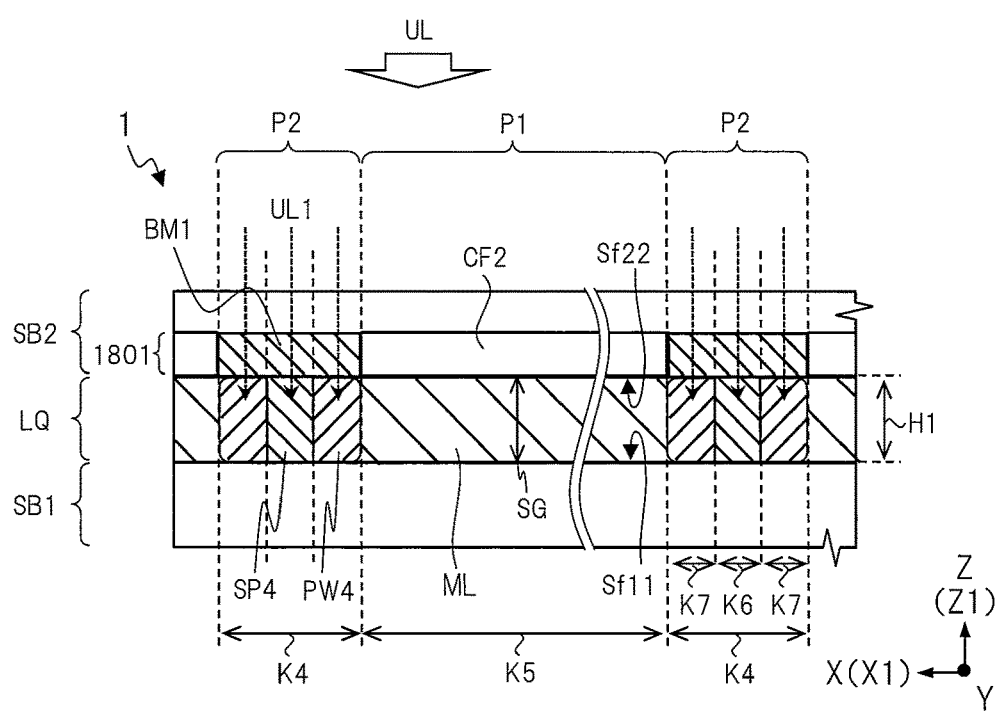
FIG. 18 is a diagram showing a cross-sectional configuration of the display area in the X direction in the state of the polymer-wall forming step regarding a fourth mode configuration in the display apparatus in the fifth embodiment.

FIG. 18 shows a configuration example of the polymer wall PW of a fourth mode in the fifth embodiment. As a different configuration point of the fourth mode, a spacer SP4 having a width K6 that is narrower than the width K4 of the region of the first light blocking film BM1 of the non-opening P2 is formed in the liquid crystal layer LQ in a plan view. And, a polymer wall PW4 is formed around the spacer SP4.

In a layer 1801 of the second substrate SB2, the first light blocking film BM1 is arranged so as to correspond to the non-opening P2, and, for example, the second color filter CF2 is arranged so as to correspond to the opening P1. In this configuration example, the spacer SP4 is formed in the liquid crystal layer LQ so as to be connected to both the surface Sf11 of the first substrate SB1 on the lower side (Z2) and the surface Sf22 of the second substrate SB2 on the upper side (Z2) in the Z direction. The spacer SP4 has, for example, a columnar shape, and is made of a member having the UV-light blocking property and predetermined elasticity. The spacer SP4 has almost the same thickness as the thickness H1 of the liquid crystal layer LQ. More specifically, the spacer SP4 is connected to, for example, the surface of the first alignment film AL1 and the surface of the second alignment film AL2 in FIG. 8. The spacer SP4 has the width K6 that is narrower than the width K4 of the first light blocking film BM1. A relation of "K6+2×K7=K4" is established.

In the polymer-wall forming step, the emitted UV light UL penetrates the first light blocking film BM1 in a plan view but does not penetrate the second color filter CF2 because of traveling through the light blocking mask not illustrated. The UV light UL penetrates the region having the width K7 excluding the spacer SP4 in the liquid crystal layer LQ, and reacts with the monomer-added liquid crystal ML existing around the spacer SP4. In this manner, below the first light blocking film BM1, the polymer wall PW4 is formed around the portion of the spacer SP4 excluding the region of the spacer SP4. This polymer wall PW4 schematically has, for example, a columnar shape, and a side surface of the spacer SP4 and an inner surface of the polymer wall PW4 are connected to each other in the X direction or the Y direction. This polymer wall PW4 is formed so as to be connected to the surface Sf11 of the first substrate SB1 and the surface Sf22 of the second substrate SB2 (more specifically, the surface of the first alignment film AL1 and the surface of the second alignment film AL2). Therefore, this polymer wall PW4 has a predetermined function of connecting the upper and lower members. Since this polymer wall PW4 is inside the non-opening P2, the aperture ratio is secured.

As modification examples of the fourth mode, the followings are applicable. The spacer SP4 may have a thickness that is smaller than the thickness H1 of the liquid crystal layer LQ, or have a shape that is connected to only either the upper or lower surface (the surface Sf11 or the surface Sf22) of the liquid crystal layer LQ. Alternatively, as the property of the spacer SP4, a spacer having the UV-light transmitting property may be used.

In each mode of the fifth embodiment, any position is basically applicable as the arrangement positions of various spacers in the display area DA. However, particularly in order to secure the aperture ratio, the position is within the non-opening P2. The arrangement positions, densities and others of the spacers are designed in accordance with the properties to be secured by the functions of the spacers in the display area DA.

[Effect and Others (5)]

As described above, according to the fifth embodiment, the polymer wall PW can be easier to be formed by the correspondence to the structure of the spacer, and the connection performance between the upper and lower members and the reduction in the change of the cell gap can be achieved by the combined structure of the spacer and the polymer wall PW.

Sixth Embodiment

Figure 19:
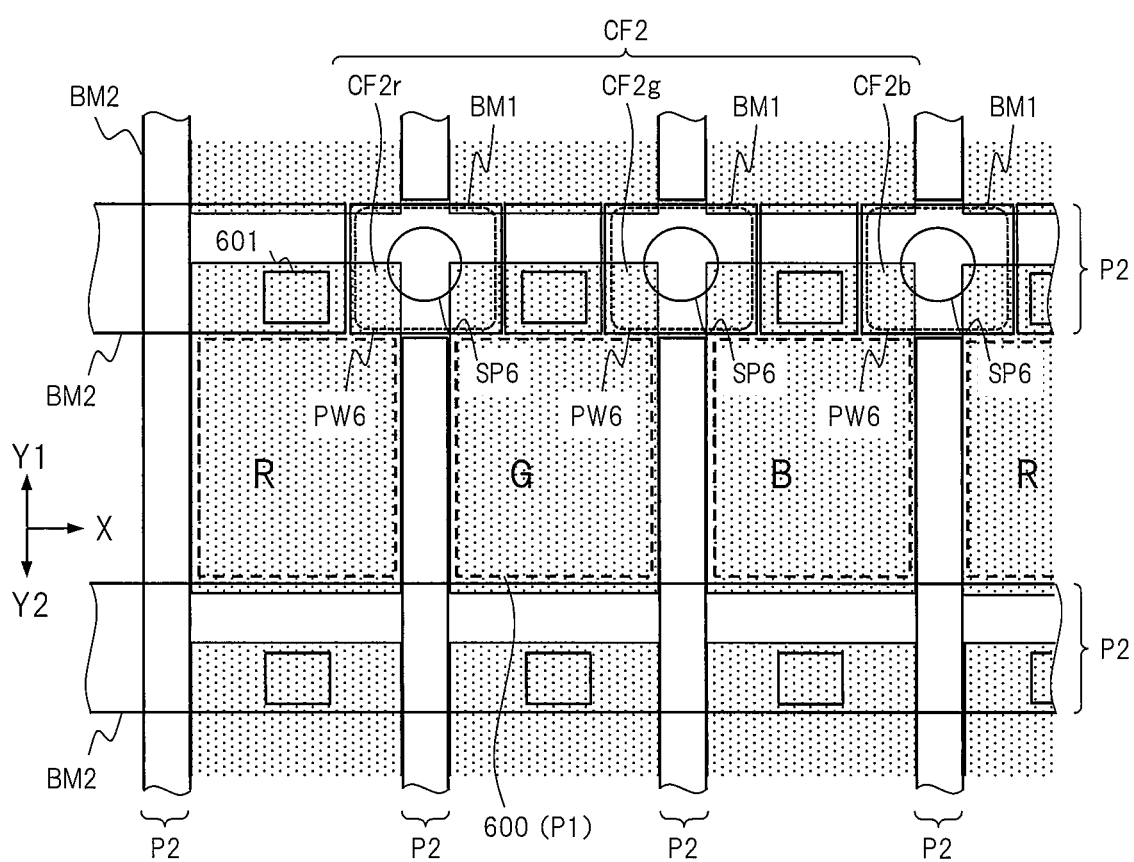
FIG. 19 is a diagram showing a planar configuration of a display area in a display apparatus of a sixth embodiment of the present invention.
Figure 20:
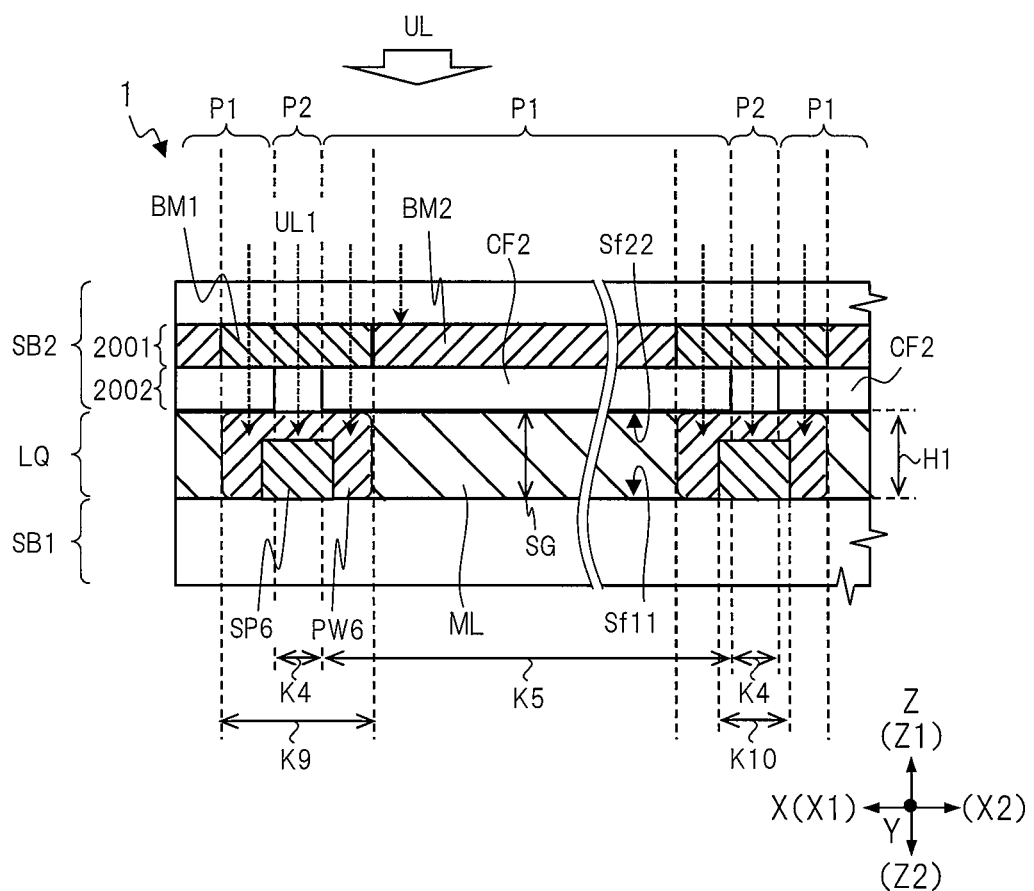
FIG. 20 is a diagram showing a cross-sectional configuration in an X direction in the display apparatus of the sixth embodiment.

With reference to FIGS. 19 and 20, a display apparatus of a sixth embodiment will be explained. In the display apparatus of the sixth embodiment, when the display area DA is viewed in a plan view, the first light blocking film BM1 and the polymer wall PW are limitedly formed in only a region at a specific position. The first light blocking film BM1 is arranged at the specific position inside the non-opening P2 between the pixels, such as the position of the horizontal black film or the crossing point in the grid-form light blocking film, and the polymer wall PW is formed in a region below the first light blocking film BM1, the region overlapping the first light blocking film BM1.

[Planar Configuration (6)]

FIG. 19 shows a planar configuration on the X-Y plane in a case of a plan view of around the R, G and B pixels of the display area DA in the display apparatus 1 of the sixth embodiment. Particularly, the drawing shows an arrangement configuration example of the first light blocking film BM1 and the second light blocking film BM2 and others. A case of usage of the second color filter CF2 as the color filter CF will be described. The present configuration example includes the vertical black film and the horizontal black film as the grid-form light blocking film as similar to the above-described first embodiment (FIG. 6). In the present configuration example, the vertical black film and the horizontal black film are basically made of the conventional second light blocking film BM2. The specific region, more particularly the crossing point region that is the region between the pixels, of the second light blocking film BM2 that is the horizontal black film extending in the X direction is made of the first light blocking film BM1. In the crossing point region, the first light blocking film BM1 is arranged while the second light blocking film BM2 is not arranged. In this configuration example, in the region between the pixels, the first light blocking film BM1 is arranged particularly in a region around the crossing point, the region being close to a circuit region 601 such as a transistor of the pixel. In this configuration example, particularly, the first light blocking film BM1 is arranged in the region between the respective color pixels that are next to each other, in other words, in each of a region between the R-color pixel and the G-color pixel, a region between the G-color pixel and the B-color pixel and a region between the B-color pixel and the R-color pixel.

Note that the configuration is not limited to such a configuration example. As different configuration examples, the first light blocking film BM1 may be arranged only in a region between specific-color pixels (such as the region between the B-color pixel and the R-color pixel). Alternatively, the first light blocking film BM1 may be similarly arranged in all regions of a plurality of horizontal black films that are arranged in the Y direction, or the first light blocking film BM1 may be arranged in specific horizontal black films having a predetermined distance or others therebetween. The example of FIG. 19 shows a case in which the first light blocking film BM1 is arranged in the horizontal black film on the upper side (Y1) while the first light blocking film BM1 is not arranged in the horizontal black film on the lower side (Y2) in the Y direction.

In the configuration example of FIG. 19, particularly, the region where the first light blocking film BM1 is arranged corresponds to the region where a spacer SP6 is arranged. In other words, in the liquid crystal layer LQ, the spacer SP is arranged in the region between the pixels, particularly the region corresponding to the crossing point of the grid-form black film. This spacer SP6 has, for example, a columnar shape, and is connected to the surface Sf11 of the first substrate SB1. This spacer SP6 has, for example, the visible-light blocking property. In a plan view, the first light blocking film BM1 is arranged in a rectangular region surrounding the spacer SP6 so as to correspond to the position of the spacer SP6. In a plan view, a polymer wall PW6 is formed so as not to protrude out of the horizontal black film and into the opening P1 in a plan view.

FIG. 20 shows a cross-sectional configuration of the configuration example of FIG. 19 in the X direction, particularly the cross section of the horizontal black film. In this configuration example, the second substrate SB2 includes a layer 2001 and a layer 2002. In the layer 2001, the second light blocking film BM2 is arranged in the region of the horizontal black film of the grid-form light blocking film, and the first light blocking film BM1 is arranged in the crossing point region (including the non-opening P2) with the vertical black film. In this configuration example, a width K9 of the first light blocking film BM1 in the X direction is larger than the width K4 of the non-opening P2 and the vertical black film. In the layer 2002, the second color filter CF2 having the UV-light transmitting property is arranged in the region corresponding to the opening P1. A thickness of the spacer SP6 is smaller than the thickness H1 of the liquid crystal layer LQ. A width K10 of the spacer SP6 is larger than the width K4 of the non-opening P2, but smaller than the width K9 of the first light blocking film BM1. A width of the polymer wall PW6 is controlled in the step so as to be, for example, equal to or smaller than the width K9 of the first light blocking film BM1.

In the polymer-wall forming step, the UV light UL that has been emitted in the Z direction penetrates the first light blocking film BM1 of the second substrate SB2 in a plan view but does not penetrate the second light blocking film BM2. In the region below the first light blocking film BM1, the UV light UL reacts with the monomer-added liquid crystal ML excluding the spacer SP6. In this manner, below the first light blocking film BM1, the polymer wall PW6 is formed in the region excluding the spacer SP6. In this configuration example, since the polymer wall PW6 is formed around the spacer SP6, the volume of the formed polymer wall PW can be reduced as similar to the above-described embodiments, and the necessary emission duration of the UV light UL in the step or others can be reduced. Since the polymer wall PW6 is formed so as to be in contact with each surface of the polymer wall PW6, predetermined connection performance is provided even when the volume of the polymer wall PW6 is relatively small. The specific arrangement positions, densities and others of the spacer SP6, the first light blocking film BM1 and the polymer wall PW6 may be designed in accordance with the necessary connection performance or others in the display area DA.

[Effect and Others (6)]

As described above, according to the sixth embodiment, the polymer wall PW6 can be easier to be formed by the correspondence to the spacer SP6, and the connection performance and the reduction in the change of the cell gap can be achieved by the combined structure of the spacer aSP6 and the polymer wall PW6.

As modification examples of the sixth embodiment, the followings are applicable. Not only the above-described configuration but also a configuration in which the first light blocking film BM1 and the polymer wall PW are limitedly arranged in the specific region without the spacer are applicable. Alternatively, as the modification example, the specific region where the first light blocking film BM1 is formed may be configured so that the spacer SP6 and the first light blocking film BM1 are arranged in the region of the horizontal black film in accordance with a position between the vertical black films, such as a position with the circuit region 601 such as the transistor in FIG. 19.

Another Embodiment

As a display apparatus of another embodiment, the following modification example is cited.

Modification Example (1)

Figure 21:
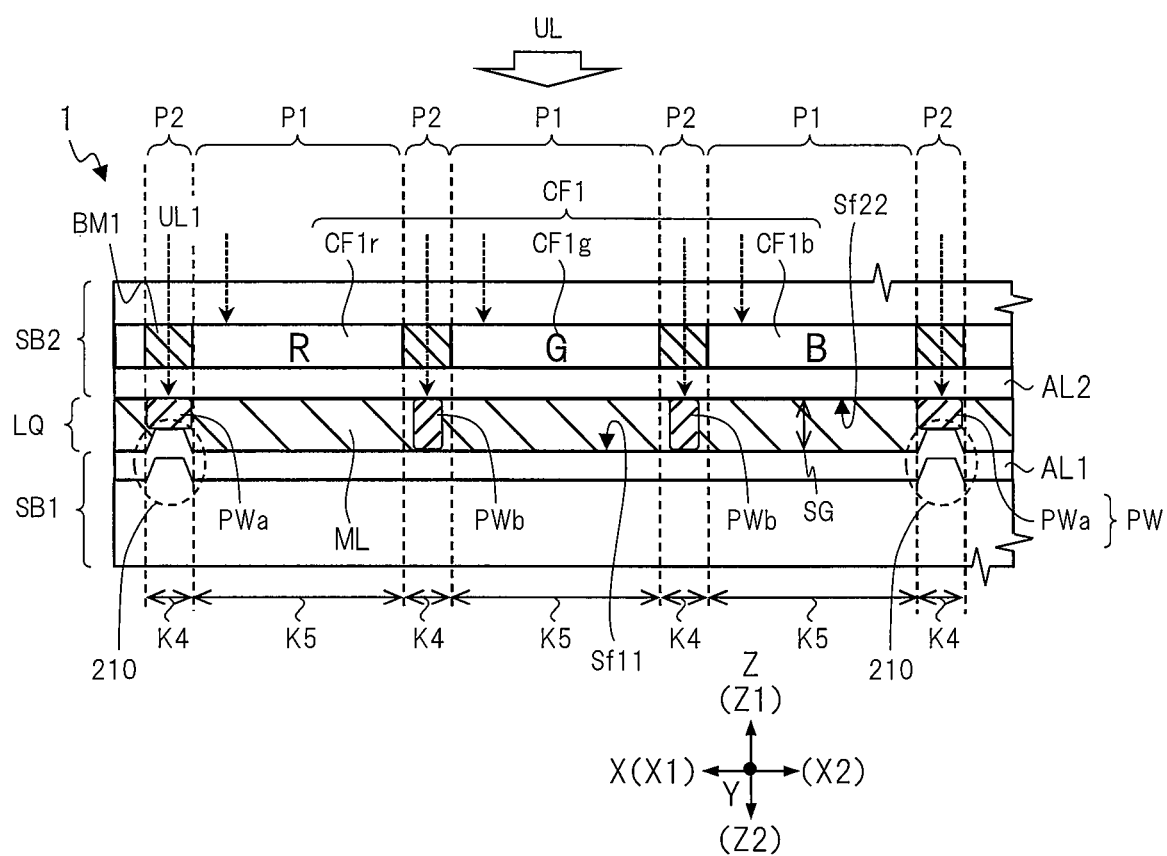
FIG. 21 is a diagram showing a cross-sectional configuration of a display area in an X direction in a display apparatus in another embodiment.

FIG. 21 shows a cross-sectional configuration on the X-Z plane of the display area DA in the display apparatus 1 of the modification example. This configuration example corresponds to modification examples of the fifth and sixth embodiments. In the fifth and sixth embodiments, the spacer serving as the protrusion is formed in the liquid crystal layer LQ. On the other hand, in this modification example, a step serving as the protrusion is formed in place of the spacer. This step is formed in, for example, the surface Sf11 of the first substrate SB1. In the second substrate SB2, the first light blocking film BM1 is arranged so as to correspond to the non-opening P2 as similar to the above-described embodiments. In the opening P1, the first color filter CF1 (or may be the second color filter CF2) is arranged.

In the configuration example of FIG. 21, a step 210 is formed at a specific position of the surface Sf11 on the upper side (Z1) of the first substrate SB1 in the Z direction in a plan view (that is a specific position of a surface of the corresponding first alignment film AL1). The specific position is, for example, a position corresponding to a specific non-opening P2 (such as the region between the B-color pixel and the R-color pixel) among the plurality of the non-openings P2 in the X direction. The step 210 protrudes so as to be higher in the Z direction than surrounding portions. In other words, an upper surface of the step 210 is at a position that is higher than the surface of the first alignment film AL1 at a different position inside the liquid crystal layer LQ. Therefore, the distance (cell gap SG) of the liquid crystal cell in the Z direction is shorter at the position with the step 210 than the different position without the step 210.

In the polymer-wall forming step, the UV light UL (UL1) that has been emitted in the Z direction penetrates the first light blocking film BM1 in a plan view, and reacts with the monomer-added liquid crystal ML below the first light blocking film BM1. In this manner, a polymer wall PW (PWa and PWb) is formed between the first alignment film AL1 and the second alignment film AL2. The polymer wall PWb (second-type polymer wall) is formed at the position without the step 210 below the first light blocking film BM1 so as to connect the surface of the first alignment film AL1 and the surface of the second alignment film AL2 as similar to the above description. The polymer wall PWa (first-type polymer wall) is formed at the position with the step 210 below the first light blocking film BM1 so as to connect an upper surface of the step 210 and the surface of the second alignment film AL2. In this configuration example, two types of the polymer walls PW (PWa and PWb) having a different thickness from each other are formed. A volume of the polymer wall PWa at the position with the step 210 can be reduced because of the thickness of the step 210. Therefore, as similar to the embodiment using the spacer, the emission duration of the UV light UL or others can be reduced.

Not only the configuration example of FIG. 21 but also a configuration in which the first light blocking film BM1 and the polymer wall PW are formed only at the position with the step 210 are applicable. Not only the configuration example of FIG. 21 but also various examples are applicable for a shape, a width and others of the step 210. The step 210 as described above may be formed at any position in the display area DA. The step may be formed in the surface Sf22 of the second substrate SB2. The step and the spacer may be mixed. The step may be formed in accordance with, for example, the existence or pattern of various electrodes, or may be formed by control of the thickness.

Modification Example (2)

As modification examples of the first and second embodiments, the width of the polymer wall PW that is formed below the first light blocking film BM1 of the non-opening P2 as shown in FIG. 5 may be larger than the width K4 of the first light blocking film BM1. In this configuration example, a part of the polymer wall PW is formed so as to protrude by a predetermined distance from an end of the first light blocking film BM1 into the opening P1 in the X direction or the Y direction. The predetermined distance of the protrusion of the part of the polymer wall PW is controlled in the step so as to be within an allowable predetermined distance. In the case of this configuration, since the volume of the polymer wall PW increases instead of the slight decrease of the aperture ratio to be lower than those of the above-described embodiments, the connection performance resulted from the polymer wall PW can be made larger. On the premise for the sufficient securement of the aperture ratio, priority may be put on the connection performance in such a configuration.

Modification Example (3)

As a modification example of the combination of the spacer and the polymer wall as described in the fifth and sixth embodiments, an aspect of addition of a photo-radical polymerization initiator to a material making up the spacer is cited. The photo-radical polymerization initiator has an effect easily changing the monomer to the polymer. Therefore, in this aspect, the change from the monomer to the polymer in the liquid crystal material is preferentially generated around the spacer, so that the growth of the polymer can be concentrated around the spacer. In this manner, a speed of the formation of the polymer wall can be accelerated. In other words, the display apparatus of this modification example includes: the protrusion such as the spacer made of a material added with the photo-radical polymerization initiator; and the polymer wall formed around the protrusion.

In this aspect, the photo-radical polymerization initiator may be mixed with the spacer, or may be arranged so as to be applied on the existing spacer. In other words, in this aspect, the photo-radical polymerization initiator may be arranged between the protrusion and the polymer wall.

As a material of the photo-radical polymerization initiator, the following materials are cited. In this aspect, at least one material selected from the following materials is applicable.

Acetophenone,
p-Anisil,
Benzil,
Benzoin,
Benzophenone,
2-Benzoylbenzoic Acid,
4,4'-Bis (diethylamino)benzophenone,
4,4'-Bis(dimethylamino)benzophenone,
Benzoin Methyl Ether,
Benzoin Isopropyl Ether,
Benzoin Isobutyl Ether,
Benzoin Ethyl Ether,
4-Benzoylbenzoic Acid,
2,2'-Bis(2-chlorophenyl)-4,4',5,5'-tetraphenyl-1,2'-biimidazole,
Methyl 2-Benzoylbenzoate,
2-(1,3-Benzodioxol-5-yl)-4,6-bis(trichloromethyl)-1,3,5-triazine,
2-Benzyl-2-(dimethylamino)-4'-morpholinobutyrophenone,
(±)-Camphorquinone,
2-Chlorothioxanthone,
4,4'-Dichlorobenzophenone,
2,2-Diethoxyacetophenone,
2,2-Dimethoxy-2-phenylacetophenone,
2,4-Diethylthioxanthen-9-one,
Diphenyl(2,4,6-trimethylbenzoyl)phosphine Oxide,
1,4-Dibenzoylbenzene,
2-Ethyl anthraquinone,
1-Hydroxycyclohexyl Phenyl Ketone,
2-Hydroxy-2-methylpropiophenone,
2-Hydroxy-4'-(2-hydroxyethoxy)-2-methylpropiophenone,
2-Isopropylthioxanthone,
Lithium Phenyl(2,4,6-trimethylbenzoyl)phosphinate,
2-Methyl-4'-(methylthio)-2-morpholinopropiophenone,
2-Isonitrosopropio phenone,
2-Phenyl-2-(p-toluenesulfonyloxy) acetophenone, and
Phenylbis(2,4,6-trimethylbenzoyl)phosphine Oxide.

In the foregoing, the present invention made has been concretely described on the basis of the embodiments. However, the present invention is not limited to the foregoing embodiments, and various modifications and alterations can be made within the scope of the present invention. A configuration of combined, added, eliminated and design-changed elements (such as members and steps) each of the above-described embodiments and others is applicable. The foregoing is the explanation in the case of the liquid crystal display apparatus having the liquid crystal layer as the electrooptic layer. The display apparatus is not limited to this, and a case of a display apparatus having a different electrooptic layer is similarly applicable. The electrooptic layer may be a layer including an element, an optical property of which is changed by application of electric energy. Even in a case of an electrooptic layer that is not the liquid crystal layer, the polymer wall PW may be a member that connects the surface Sf11 of the first substrate SB1 and the surface Sf22 of the second substrate SB2. The configuration of the electrodes or others is not limited to those of the above-described display apparatuses, and the display apparatus may further include, for example, an electrode for use in touch detection or others. Each of the above-described display apparatuses is applicable to an electronic paper apparatus that can be freely bent, a curved-surface display apparatus that is arranged in a curved state so as to be visually recognized and others. Each of the above-described display apparatuses is also applicable as a display apparatus embedded in various electronic devices.

1 . . . display apparatus, 501 . . . layer, SB1 . . . first substrate, SB2 . . . second substrate, LQ . . . liquid crystal layer, P1 . . . opening, P2 . . . non-opening, BM1 . . . first light blocking film, CF2 . . . second color filter, ML . . . monomer-added liquid crystal, PW . . . polymer wall, MSK . . . light blocking mask, UL . . . UV light, Sf11, Sf12, Sf21 and Sf22 . . . surface

The invention claimed is:

1. A display apparatus comprising:
a first substrate having flexibility;
a second substrate having flexibility;
an electrooptic layer between a first surface of the first substrate and a second surface of the second substrate; and
a display area including a plurality of pixels and made of the first substrate, the second substrate and the electrooptic layer,
wherein the second substrate includes:
a color filter arranged in a visible-light transmitting portion of each pixel of the plurality of pixels in the display area in a plan view; and
a first light blocking film having an ultraviolet-light transmitting property and arranged between pixels of the plurality of pixels in the display area in a plan view, and
the electrooptic layer is arranged in a region overlapping the first light blocking film in a plan view, and has a polymer wall connecting the first surface of the first substrate and the second surface of the second substrate,
wherein the second substrate includes a grid-form light blocking film arranged in the region between the pixels in the plan view, and
the grid-form light blocking film includes a second light blocking film having an ultraviolet-light blocking property and arranged so as to extend in a first direction inside the display area, and the first light blocking film arranged so as to extend in a second direction crossing the first direction.

2. The display apparatus according to claim 1, wherein the second substrate includes a first color filter having an ultraviolet-light blocking property as the color filter.

3. The display apparatus according to claim 1, wherein the second substrate includes a second light blocking film having an ultraviolet-light blocking property and arranged in parallel to the first light blocking film in the region between the pixels in the plan view, and
a length of the polymer wall in a first direction inside the display area is within a length of a combined region of the first light blocking film and the second light blocking film in the first direction in the region between the pixels.

4. The display apparatus according to claim 2, wherein the second substrate includes a region where the first light blocking film and the first color filter do not overlap each other and a region where the first light blocking film and the first color filter overlap each other in the region between the pixels in the plan view, and a length of the polymer wall in a first direction inside the display area is within a length of the first light blocking film in the first direction.

5. The display apparatus according to claim 1, wherein the electrooptic layer is arranged in a region overlapping the first light blocking film in a plan view, and includes a protrusion formed in the first surface or the second surface, and the polymer wall is formed between the protrusion and the first surface or the second surface.

6. The display apparatus according to claim 3, wherein the electrooptic layer is arranged in a region overlapping the first light blocking film in a plan view, and includes a protrusion formed in the first surface or the second surface, and the polymer wall is formed between the protrusion and the first surface or the second surface.

7. The display apparatus according to claim 1, wherein the electrooptic layer is arranged in a region overlapping the first light blocking film in a plan view, and includes a protrusion connected to the first surface or the second surface, and the polymer wall is formed between the protrusion and the first surface or the second surface and formed in contact with a side surface of the protrusion.

8. The display apparatus according to claim 1, wherein the electrooptic layer is a liquid crystal layer containing monomer-added liquid crystal, and a normalized transmittance of the first light blocking film at a monomer absorbing wavelength of the monomer-added liquid crystal is larger than a normalized transmittance of the color filter.

9. A display apparatus comprising:

a first substrate having flexibility;

a second substrate having flexibility;

an electrooptic layer between a first surface of the first substrate and a second surface of the second substrate; and a display area including a plurality of pixels and made of the first substrate, the second substrate and the electrooptic layer, wherein the second substrate includes:

a color filter arranged in a visible-light transmitting portion of each pixel of the plurality of pixels in the display area in a plan view; and a first light blocking film having an ultraviolet-light transmitting property and arranged between pixels of the plurality of pixels in the display area in a plan view, and the electrooptic layer is arranged in a region overlapping the first light blocking film in a plan view, and has a polymer wall connecting the first surface of the first substrate and the second surface of the second substrate, wherein the second substrate includes a grid-form light blocking film arranged in the region between the pixels, and the grid-form light blocking film includes the first light blocking film arranged in a specific region of the region between the pixels and a second light blocking film having an ultraviolet-light blocking property and arranged in a region excluding the specific region.

10. The display apparatus according to claim 5, wherein a photo-radical polymerization initiator is added to a material for forming the protrusion.

11. The display apparatus according to claim 5, wherein a photo-radical polymerization initiator is arranged between the protrusion and the polymer wall.

* * * * *